United States Patent
Mitchell

(10) Patent No.: US 11,961,186 B2
(45) Date of Patent: Apr. 16, 2024

(54) METHOD AND SYSTEM FOR VISUALLY SEAMLESS GRAFTING OF VOLUMETRIC DATA

(71) Applicant: Roblox Corporation, San Mateo, CA (US)

(72) Inventor: Kenneth J. Mitchell, Burbank, CA (US)

(73) Assignee: Roblox Corporation, San Mateo, CA (US)

(*) Notice: Subject to any disclaimer, the term of this patent is extended or adjusted under 35 U.S.C. 154(b) by 104 days.

(21) Appl. No.: 17/855,356

(22) Filed: Jun. 30, 2022

(65) Prior Publication Data

US 2024/0005605 A1 Jan. 4, 2024

(51) Int. Cl.
*G06T 17/20* (2006.01)
*G06T 15/08* (2011.01)
*G06T 19/20* (2011.01)

(52) U.S. Cl.
CPC ............ *G06T 17/205* (2013.01); *G06T 15/08* (2013.01); *G06T 19/20* (2013.01); *G06T 2219/2021* (2013.01)

(58) Field of Classification Search
CPC ....... G06T 17/205; G06T 15/08; G06T 19/20; G06T 2219/2021
See application file for complete search history.

(56) References Cited

U.S. PATENT DOCUMENTS 7,219,039 B1 * 5/2007 Shepherd ................ G06T 17/10
703/2

OTHER PUBLICATIONS

Radwan, Virtual brain grafting: Enabling whole brain parcellation in thepresence of large lesions, NeuroImage vol. 229, Apr. 2021 (Year: 2021).*
Berberi, Evaluation of Three-Dimensional Volumetric Changes After Sinus Floor Augmentation with Mineralized Cortical Bone Allograft, J Maxillofac Oral Surg. Sep. 2015; 14(3): 624-629. Published online Dec. 24, 2014. (Year: 2014).*
Schneider, Andrew, "The real-time volumetric cloudscapes of horizon: Zero dawn", N Vos—Advances in Real-time Rendering, SIGGRAPH, 2015 (Available online—http://advances.realtimerendering.com), May 13, 2015, 99 pages.

(Continued)

*Primary Examiner* — Phuc N Doan
(74) *Attorney, Agent, or Firm* — IP Spring

(57) ABSTRACT

Visually seamless grafting of volumetric data. In some implementations, a method includes obtaining volumetric data that represents a first volume including one or more three-dimensional objects. Planar slices of the first volume are determined and for each planar slice, a result region and an outer region are determined, the outer region located between the result region and an edge of the planar slice. A target region is determined within the result region and adjacent to an edge of the result region. The result region is modified by updating source voxels in the target region based on corresponding continuity voxels in the outer region, and the updating is weighted based on a distance of each source voxel from an associated edge of the result region. The modified result regions are grafted to a second volume at the edge of the result regions to provide a grafted volume.

20 Claims, 7 Drawing Sheets

(56) References Cited

OTHER PUBLICATIONS

Keinert, Benjamin et al., "Enhanced Sphere Tracing", STAG: Smart Tools & Apps for Graphics (Available online—https://diglib.eg.org/bitstream/handle/10.2312/stag.20141233.001-008/001-008.pdf?sequence=1&isAllowed=y), 2014, 8 pages.

Bloom, Charles, "Terrain Texture Compositing by Blending in the Frame-Buffer", (Available online—https://cbloom.com/3d/techdocs/splatting.txt), 2000, 7 pages.

Gustavson, Stefan et al., "Tiling simplex noise and flow noise in two and three dimensions", Journal of Computer Graphics Techniques (JCGT), vol. 11, (Available online http://jcgt.org/published/0011/01/02/), 2022, pp. 17-33.

Perlin, Ken, "An image synthesizer", ACM Siggraph Computer Graphics, vol. 19, (Available online—https://dl.acm.org/doi/pdf/10.1145/325165.325247), Nov. 3, 1985, pp. 287-296.

Mitchell, Kenny, "Pixel shader optimizations for terrain rendering", Graphics programming methods (Available online—https://dl.acm.org/doi/abs/10.5555/957155.957188), Jan. 2003, 327-335 pages.

Cohen, Michael F. et al., "Wang Tiles for Image and Texture Generation", ACM Transactions on Graphics, vol. 22, Issue 3, 2003, pp. 287-294.

Felzenszwalb, Pedro F. et al., "Distance Transforms of Sampled Functions", Theory of Computing, vol. 8, 2012, pp. 1-15 (415-428).

Worley, Steven, "A cellular texture basis function", SIGGRAPH '96: Proceedings of the 23rd annual conference on Computer graphics and interactive techniques, (Available online—https://dl.acm.org/doi/pdf/10.1145/237170.237267), Aug. 1996, 11 pages.

Hadrich, Torsten et al., "Stormscapes: Simulating Cloud Dynamics in the Now", ACM Transactions on Graphics, vol. 39, Issue 6, Article No. 175, (Available online—https://doi.org/10.1145/3414685.3417801), Dec. 2020, 16 pages.

Barnes, Connelly, et al., "PatchMatch: A Randomized Correspondence Algorithm for Structural Image Editing", ACM Transactions on Graphics (Proc. SIGGRAPH), Aug. 2009; retrieved from Internet (https://pixl.cs.princeton.edu/pubs/Barnes_2009_PAR/patchmatch.pdf), Aug. 2009, 10 pages.

Mikkelsen, Morten S., "Practical Real-Time Hex-Tiling", Journal of Computer Graphics Techniques (JCGT) 11, Aug. 15, 2022, 17 pages.

* cited by examiner

METHOD AND SYSTEM FOR VISUALLY SEAMLESS GRAFTING OF VOLUMETRIC DATA

TECHNICAL FIELD

This disclosure relates to the field of computer-implemented volume rendering and, in particular, to methods, systems, and computer readable media for grafting volumetric data.

BACKGROUND

Visual data that represents images or volumes such as objects or textures can be expanded in a variety of ways in a virtual environment to be rendered over an area or region that is larger than the visual data. For example, an object or volume represented in visual data can be grafted to other objects or volumes. In some examples, it may be desirable to use small portions of content that are reusable across a wider space and that can efficiently be stored in lower amount of storage. For example, an image or other content portion can be tiled, where the image tile is copied and the copied tiles grafted to each other and repeated in rows or other patterns to cover an area that is larger than the area covered by the original content. For example, a cloud image can be tiled across a sky in a virtual environment. Visual data can also be extended, e.g., stretched so that the visual data covers a larger area than the original visual data. An object in visual data can also be grafted to a different object such that the two portions appear to be a single object.

An issue with some forms of expansion of visual data is that the interface between different grafted portions of visual data may have a visible border or discontinuities where the tiles are joined, e.g., border artifacts. In many applications, it is important for the interface between the two portions to be visually seamless or continuous without showing any such discontinuities. However, existing techniques may not be adequate in providing a seamless transition at the connection of grafted tiles or other volumes.

In addition, existing techniques for expanding visual data concentrate on two-dimensional (2D) images and not shapes or volumes defined by volumetric or three-dimensional (3D) data. Tiling 3D volumetric data may have differences in terms of the data that encodes shape, structure, topology, etc. Extension of 2D tiling to 3D volume rendering is non-trivial. Furthermore, renderings of grafted 3D volumetric data by existing techniques for 2D data may produce unsightly discontinuities at joined edges or other visual artifacts that reduce the quality of the grafted tile, e.g., in terms of suitability for use in a virtual environment. Accordingly, there may exist a need for improved techniques that can efficiently graft volumetric visual data seamlessly.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Implementations of this application relate to visually seamless grafting of volumetric data. In some implementations, a method includes obtaining, by one or more processors, volumetric data that represents a first volume including one or more three-dimensional (3D) volumetric objects. A plurality of planar slices of the first volume are determined, each planar slice including a plurality of voxels that depict an associated planar portion of the first volume. For each planar slice, a result region and an outer or continuity region in the planar slice are determined, the continuity region being located between the result region and an edge of the planar slice. A target region is determined within the result region and adjacent to an edge of the result region. The result region is modified by the one or more processors by updating a plurality of source voxels in the target region based on corresponding continuity voxels in the continuity region, and the updating is weighted based on a distance of each source voxel from an associated edge of the result region. The modified result regions of the planar slices of the first volume are grafted to a second volume at the edge of the result regions to provide a grafted volume.

Various implementations and examples of the method are described. For example, in some implementations, the target region is located between an interior region of the result region and the continuity region. In some implementations, the continuity voxels are located in the continuity region at a distance from the edge of the result region that is the same as a distance of the corresponding modified source voxels in the result region from the edge of the result region. In some implementations, the result region is a tile region, the continuity region completely surrounds the result region, and the second volume is a copy of the modified result region of the first volume. In some implementations, modifying the source voxels in the target region is additionally based on one or more other source voxels located adjacent to the source voxels.

In some implementations, modifying the source voxels in the target region is additionally based on prior voxels that correspond to the source voxels, the prior voxels included in a prior planar slice that is generated by a shaping function. In some of these implementations, the prior slice has a same size as the result region, and each corresponding prior voxel is at a distance from the edge of the prior slice that is the same as a distance of the corresponding source voxel from the edge of the result region. In some of these implementations, the shaping function includes a function that is used in generation of the first volume, and/or the shaping function is based on a deep learning model trained with training data that represents volumes similar to the first volume. In some implementations, for each source voxel, the corresponding prior voxel of the prior slice is used to determine one of: keep the source voxel unchanged; modify the source voxel to be the same as the corresponding continuity voxel; or modify the source voxel to be the same as an opposite voxel on an opposite side of the target region.

In some implementations, modifying the source voxels in the target region is additionally based on corresponding opposite voxels in the target region located at opposite sides of the target region to the source voxels. In some examples, each opposite voxel is at a distance from the edge of the result region that is the same as a distance of the corresponding source voxel from the edge of the result region. In some implementations, modifying the source voxels in the target region includes setting one or more of the source voxels to a same value as the value of a corresponding opposite voxel.

In some implementations, the method further includes generating the second volume, wherein the second volume is grafted to the first volume to extend the first volume. In some implementations, the volumetric data is in a format of three dimensional (3D) volume scalar density data, and the method further includes, prior to determining the result region and the continuity region, converting the volumetric data to binary field data that represents voxels that are either inside or outside at least one of the one or more 3D volumetric objects represented in the first volume. In some implementations, the grafted volume is represented in distance field data.

In some implementations, a system includes at least one processor and a memory coupled to the at least one processor, with instructions stored thereon that, when executed by the at least one processor, cause the at least one processor to perform operations. The operations include obtaining volumetric data that represents a first volume including one or more three-dimensional (3D) volumetric objects; determining a plurality of planar slices of the first volume, wherein each planar slice includes a plurality of voxels depicting an associated planar portion of the first volume. For each of the planar slices of the first volume, the operations include determining a result region and an outer region in the planar slice, wherein the outer region is located between the result region and an edge of the planar slice; determining a target region within the result region, the target region being located adjacent to an edge of the result region; and modifying the result region by modifying source voxels in the target region based on corresponding opposite voxels in the target region located at opposite sides of the target region to the source voxels, wherein the modifying is weighted based on a distance of the source voxels from the edge of the result region. The operations include grafting the modified result regions of the planar slices of the first volume to a second volume at the edge of the result regions to provide a grafted volume.

Various implementations and examples of the system are described. For example, in some implementations, modifying the source voxels in the target region is additionally based on continuity voxels in the outer region, the continuity voxels corresponding to the source voxels.

In some implementations, a non-transitory computer readable medium has stored thereon software instructions that, when executed by a processor of a device, cause the processor to perform operations. The operations include obtaining volumetric data representing a first volume including one or more 3D volumetric objects, and determining a plurality of planar slices of the first volume, wherein each planar slice includes a plurality of voxels depicting an associated planar portion of the first volume. For each of the planar slices of the first volume, the operations include: determining a result region and an outer region in the planar slice, wherein the outer region is located between the result region and an edge of the planar slice; determining a target region within the result region, the target region being located adjacent to an edge of the result region; and modifying the result region by modifying source voxels in the target region based on prior voxels that correspond to the source voxels, the prior voxels included in a prior slice that is generated by a shaping function, wherein the modifying is weighted based on a distance of the source voxels from the edge of the result region. The operations include grafting the modified result regions of the planar slices of the first volume to a second volume at the edge of the result regions to provide a grafted volume.

Various implementations and examples of the system are described. For example, in some implementations, modifying the source voxels in the target region is additionally based on at least one of: continuity voxels in the outer region, the continuity voxels corresponding to the source voxels; or corresponding opposite voxels in the target region located at opposite sides of the target region to the source voxels.

DETAILED DESCRIPTION

Figure 1:
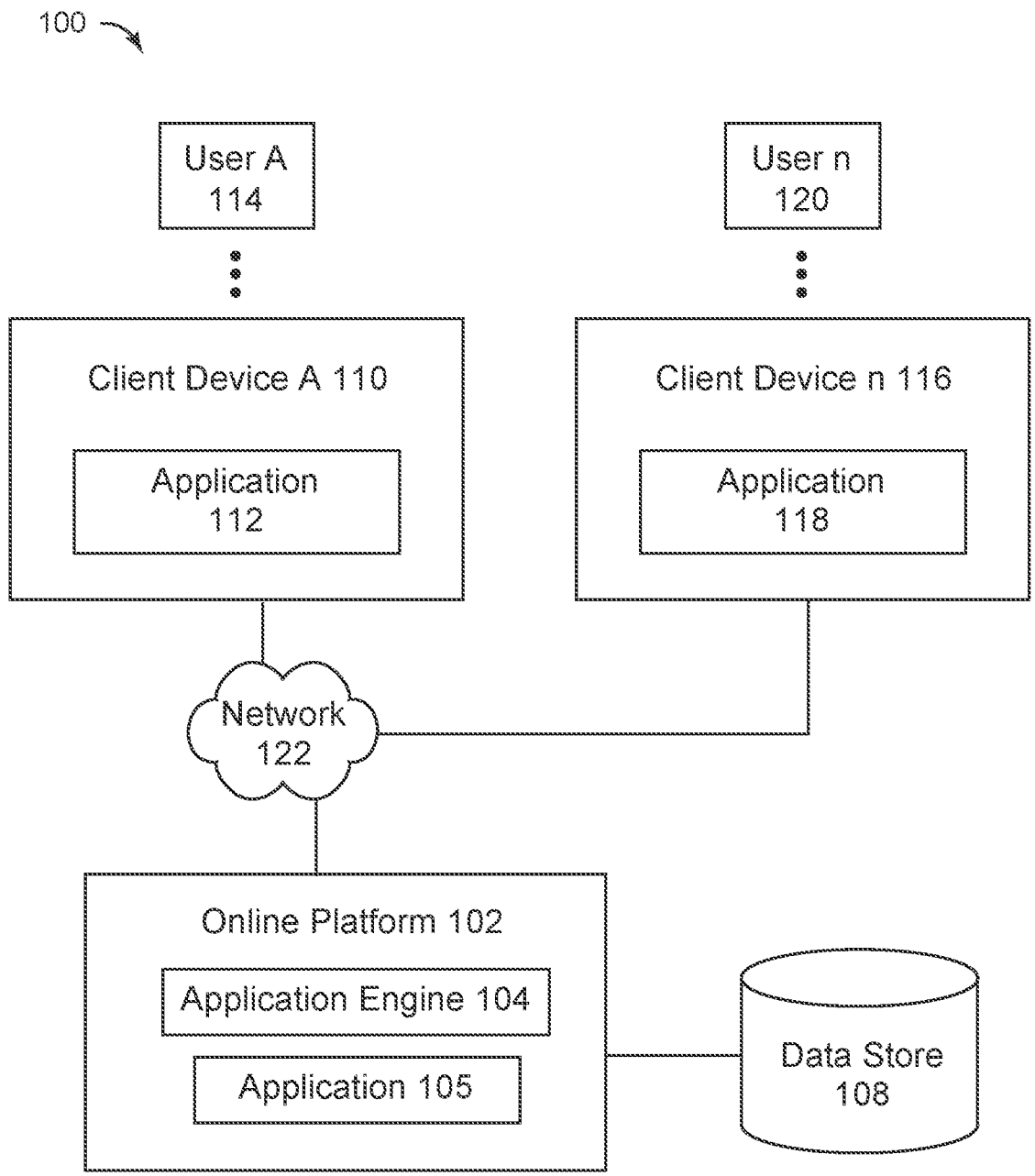
FIG. 1 is a block diagram illustrating an example system architecture which may be used to implement one or more features described herein, in accordance with some implementations.

One or more implementations described herein relate to methods and systems to provide visually seamless grafting of volumetric data. Grafting, as referred to herein, is a combining or joining of two or more volumes to provide continuity of volume content. Described features include using continuity and transition techniques on 3D volumetric data such as density fields, distance fields, etc.

Critical to high performance in real-time rendering, graphics processing units (GPUs) hold visual data locally in high speed texture video memory optimized for fast cached access. Typically, this data is represented in rectangular tiled patterns, stored once as textures, and used to compute each materials' visual appearance by copying and repeating the data to cover large 3D surfaces efficiently. While methods exist for the creation of tiling for 2D textures containing color image data, tiling 3D volumetric density data has key differences in terms of the data encoding shape, structure, topology, etc. Extension of these methods to 3D volume rendering is often omitted and is non-trivial.

Some tile generation methods can tile intrinsically, such as some noise-based generation methods. For example, the period of noise "lacunarity" layers can be generated co-incident with the dimensions of the space, often in powers of two or integer multiples. However, for more general support of artist-designed volumes or more advanced natural shapes arising from simulation data, volumes should be tiled effectively without visible seams or unsightly discontinuities at the edges where tiled volumes adjoin and meet up with the other sides of the 3D texture that covers the volumes.

Further, in cases where signed distance fields are used to represent the volume, e.g., for efficient ray traced rendering, there is an additional problem of the distance encoding, where texture wrapping modifications must maintain correct encoding of signed distance to the nearest surface including across the texture's boundaries to the other sides of the texture.

Techniques described herein can provide intelligent and informed modification of 3D voxel data in a volume to enable generation visually seamless grafted volumes. Described techniques include determining planar slices of a first volume that is represented in 3D volumetric data. For each planar slice, regions are delineated, including a result region and an outer (e.g., continuity) region located between the result region and the edge of the planar slice. A target region is determined within the result region, and source voxels within the target region are modified based on one or more other voxels in the planar slice. For example, the values of source voxels can be modified based on values of associated continuity voxels in the outer region, values of corresponding opposite voxels in the target region located at opposite sides of the target region to the source voxels, and/or values of prior voxels that correspond to the source voxels and are included in a prior slice that is generated by a shaping function. The modification of the source voxels in the target region is also weighted based on a distance of the source voxels from the edge of the result region. The modified result regions of the planar slices of the first volume form a modified first volume that is grafted to a second volume at the edge of the result regions to provide a grafted volume.

In various implementations, the target region is located between an interior region of the result region and the outer region. In some implementations, the result region is a tile region and the first volume can be tiled, e.g., such that the second volume (and additional volumes) are copies of the modified first volume and are grafted to each other to tile the first volume. In some implementations, the second volume is a different volume than the first volume, such that the first and second volumes are merged as the grafted volume. In some implementations, the second volume is generated, e.g., as an empty volume or other volume, such that the second volume is grafted to the first volume to extend the first volume. Described techniques can be used in any dimensions, e.g., for temporal volumetric tiling.

In some implementations, the first volumetric data is in a format of 3D volume scalar density data, and, prior to determining the result region and the continuity region, the first volumetric data can be converted to binary field data that represents voxels that are either inside or outside one or more objects represented in the first volume. The binary field data can be processed to modify the source voxels and provide the grafted volume. The binary field data can also be converted into signed or unsigned distance field data.

There are several technical advantages to techniques and features described herein. Features include a volume grafting (including tiling) method that modifies volumes so that edges of a previously non-tiling volume are made visually seamless when grafted to other volumes. Features described herein graft 3D volumetric data with plausible continuity and transitioning of flexible 3D structure independent of topology. Features include correcting non-tiling bounded volume textures regularly obtained from hand authored and physically simulated workflows to follow objects or shapes without visible discontinuities across 3D texture boundaries when wrapping to the other side. This supports seamless tiling of volumes and textures such as cloud volume textures, terrain textures, etc.

Described features also include a weighted modification of volume edges based on distance from edges and using reference and continuity volume information. In one or more techniques described herein, adjoining border regions are modified with reducing weight towards the inside or interior region of a 3D volume. For example, described techniques can combine adjacent volume formations with a tapered effect so that the resulting 3D volume appears to tile smoothly, while retaining the original patterned, simulated, or designed content as much as possible.

Described features also include grafting for volume binary or scalar density fields and corresponding signed or unsigned distance fields. For example, described techniques can convert volume density or occupancy data to binary field data, and process the binary field data to modify volumes for seamless grafting. The binary field representation can also be extended to a signed distance field based representation.

Described techniques and features can be used in isolation or in any combination.

The techniques described herein allows efficient rendering and storage, as well as efficient further processing. Described techniques allow greater performance and/or scalability in rendering 3D images. For example, when using one or more described techniques, large volumes can be rendered in real-time with orders of magnitude less memory use and time taken for the equivalent non-tiled volume. In some examples, using volume data resulting from described techniques, large volumes can be efficiently rendered, which scales from high-end to low-end computing hardware. For example, memory use is greatly reduced compared to previous methods without tiling, thus allowing rendering on lower end devices such as mobile devices. Computational performance is improved due to use of a small source texture or volume, which also intrinsically improves bandwidth utilization (e.g., when volume data are transferred over a network). Furthermore, extruding, extending and merging volumetric data can be efficiently performed in other applications and with visually seamless extended or merged volumes.

A technical effect of one or more described implementations is that devices expend fewer computational resources to obtain results. For example, a technical effect of described techniques is a reduction in the consumption of system processing resources and power resources as compared to prior systems that do not provide one or more of the described techniques or features. For example, a system using a prior technique may require more memory storage and processing time due to storing and processing larger volumes or 3D textures. Techniques described herein can store smaller volumes or textures and provide tiling of these to cover a larger area, increasing memory and processing efficiency. A prior system or technique may be required to perform additional processing to smooth out or otherwise address discontinuities arising between tiled volumes or textures. Techniques described herein provide seamless grafting between volumes and textures and can avoid such additional processing. If received input data is in a form of a scalar density field, prior systems or techniques may generate tile results as scalar density data. Techniques described herein can process and provide grafted volume results as binary field data and/or scalar distance field data.

Example System Architecture

FIG. 1 illustrates an example system architecture 100, in accordance with some implementations of the disclosure. The system architecture 100 (also referred to as "system" herein) includes an online platform 102, a first client device 110 (generally referred to as "client devices 110/116" herein), a network 122, and a second client device 116. The online platform 102 can include, among other things, an application engine 104, one or more applications 105, a search engine 106, and a data store 108. The client device 110 can include an application 112. The client device 116 can include an application 118. Users 114 and 120 can use client devices 110 and 116, respectively, to interact with the online platform 102.

System architecture 100 is provided for illustration. In some implementations, the system architecture 100 may include the same, fewer, more, or different elements configured in the same or different manner as that shown in FIG. 1.

In one implementation, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online platform 102 can include a server having one or more computing devices (e.g., a cloud computing system, a rackmount server, a server computer, cluster of physical servers, virtual server, etc.). In some implementations, a server may be included in the online platform 102, be an independent system, or be part of another system or platform.

In some implementations, the online platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online platform 102 and to provide a user with access to online platform 102. The online platform 102 may also include a website (e.g., one or more webpages) or application back-end software that may be used to provide a user with access to content provided by online platform 102. For example, users may access online platform 102 using the application 112/118 on client devices 110/116, respectively.

In some implementations, online platform 102 may be a type of social network providing connections between users or a type of user-generated content system that allows users (e.g., end-users or consumers) to communicate with other users via the online platform 102, where the communication may include voice chat, video chat, or text chat. In some implementations of the disclosure, a "user" may be represented as a single individual. However, other implementations of the disclosure encompass a "user" (e.g., creating user) being an entity controlled by a set of users or an automated source.

In some implementations, online platform 102 can graft volume data using one or more of the methods and features described herein. In some implementations, one or more client devices can graft volume data using one or more of the methods and features described herein.

In some implementations, online platform 102 may be a virtual gaming platform. For example, the gaming platform may provide single-player or multiplayer games to a community of users that may access or interact with games (e.g., user generated games or other games) using client devices 110/116 via network 122. In some implementations, games may be two-dimensional (2D) games, three-dimensional (3D) games (e.g., 3D user-generated games), virtual reality (VR) games, or augmented reality (AR) games, for example. Objects represented in the games can include objects that include volume data grafted (e.g., tiled) as described herein. In some implementations, users may search for games and participate in gameplay with other users in one or more games selected from results of the search. In some implementations, a game selected from results of the search may be played in real-time with other users of the game. In some implementations, gameplay may refer to interaction of one or more players using client devices (e.g., 110 and/or 116) within a game (e.g., 105) or the presentation of the interaction on a display or other output device of a client device 110 or 116.

In some implementation, online platform 102 can be a social networking platform, purchasing platform, messaging platform, creation platform, platform providing digital content for viewing and manipulation by users (e.g., medical scans, terrain maps, etc.), and so on. Other collaboration platforms can be used with features described herein (e.g., using digital objects that include grafted features) instead of or in addition to online platform 102.

One or more applications 105 are provided by the online platform. In some implementations, application 105 can include an electronic file that can be executed or loaded using software, firmware or hardware configured to present content of the application (e.g., digital media item) to an entity. For example, application 105 can be a game that present application content. In some implementations, an application 112/118 may be executed and an application 105 rendered in connection with an application engine 104.

It may be noted that 3D environments or 3D worlds use graphics that use a three-dimensional representation of geometric data representative of application content (or at least present content to appear as 3D content whether or not 3D representation of geometric data is used). 2D environments or 2D worlds use graphics that use two-dimensional representation of geometric data representative of application content.

In some implementations, the online platform 102 can host one or more applications 105 and can permit users to interact with the applications 105 (e.g., search for applications, application content, or other content) using an application 112/118 of client devices 110/116. In some implementations, users (e.g., 114 and/or 120) of the online platform 102 may play, create, search, interact with, or build applications and application content, e.g., games, videos, images, audio data, documents, etc., and communicate with other users, create and build application objects (e.g., also referred to as "item(s)" or "virtual item(s)" herein) of applications 105, and/or search for objects. For example, in generating user-generated virtual game items, users may create characters, decoration for the characters, one or more virtual environments for an interactive game, or build structures used in a game application 105, among others. In some implementations, online platform 102 may transmit application content to applications (e.g., 112). In some implementations, application objects may refer to objects that are used, created, shared or otherwise depicted in applications 105 of the online platform 102 or applications 112 or 118 of the client devices 110/116. For example, game objects may include a part, model, character, tools, weapons, clothing, buildings, vehicles, currency, flora, fauna, components of the aforementioned (e.g., windows of a building), and so forth.

It may be noted that the online platform 102 may host one or more media items that can include communication messages from one user to one or more other users. Media items can include, but are not limited to, digital video, digital movies, digital photos, digital music, audio content, melodies, web site content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, an application 105 may be associated with a particular user or a particular group of users (e.g., a private game), or made widely available to users of the online platform 102 (e.g., a public game).

In some implementations, online platform 102 or client devices 110/116 may include an application engine 104 or application 112/118. The engine 104 can include an application similar to application 112/118. In some implementations, engine 104 may be used for the development or execution of applications 105. For example, a game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the engine 104 may generate commands that help compute and render the application (e.g., rendering commands, collision commands, physics commands, etc.). In some implementations, applications 112/118 of client devices 110/116, respectively, may work independently, in collaboration with engine 104 of online platform 102, or a combination of both.

In some implementations, both the online platform 102 and client devices 110/116 execute an engine (104, 112, and 118, respectively). In various implementations, each application 105 may have a different ratio between the engine functions that are performed on the online platform 102 and the engine functions that are performed on the client devices 110 and 116.

In some implementations, a component of a digital object, such as a body part, may be a primitive geometrical shape such as a block, a cylinder, a sphere, etc., or some other primitive shape such as a wedge, a torus, a tube, a channel, etc. In some implementations, a creator module may publish an object (e.g., game character) for view or use by other users of the online platform 102. In some implementations, creating, modifying, or customizing objects, applications 105, or application environments may be performed by a user using a user interface (e.g., developer interface) and with or without scripting (or with or without an application programming interface (API)).

In some implementations, the online platform 102 may store digital objects and content created by users in the data store 108.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." The number of client devices 110 or 116 is provided as illustration, rather than limitation. In some implementations, any number of client devices 110 or 116 may be used.

In some implementations, each client device 110 or 116 may include an instance of the application 112 or 118, respectively. In one implementation, the application 112 or 118 may permit users to use and interact with online platform 102, such as search for an application or application content, control an object in a virtual game hosted by online platform 102, or view or upload content, such as games, images, video items, web pages, documents, and so forth. In one example, the application may be a web application (e.g., an application that operates in conjunction with a web browser) that can access, retrieve, present, or navigate content served by a web server. In another example, the application may be a native application (e.g., a mobile application, app, or a gaming program) that is installed and executes local to client device 110 or 116 and allows users to interact with online platform 102. The application may render, display, or present the content (e.g., a web page, a media viewer) to a user. In an implementation, the application may also include an embedded media player (e.g., a Flash® player) that is embedded in a web page.

In general, functions described in one implementation as being performed by the online platform 102 can also be performed by the client device(s) 110 or 116, or a server, in other implementations if appropriate. In addition, the functionality attributed to a particular component can be performed by different or multiple components operating together. The online platform 102 can also be accessed as a service provided to other systems or devices through appropriate application programming interfaces (APIs), and thus is not limited to use in websites.

Grafting Method

Figure 2:
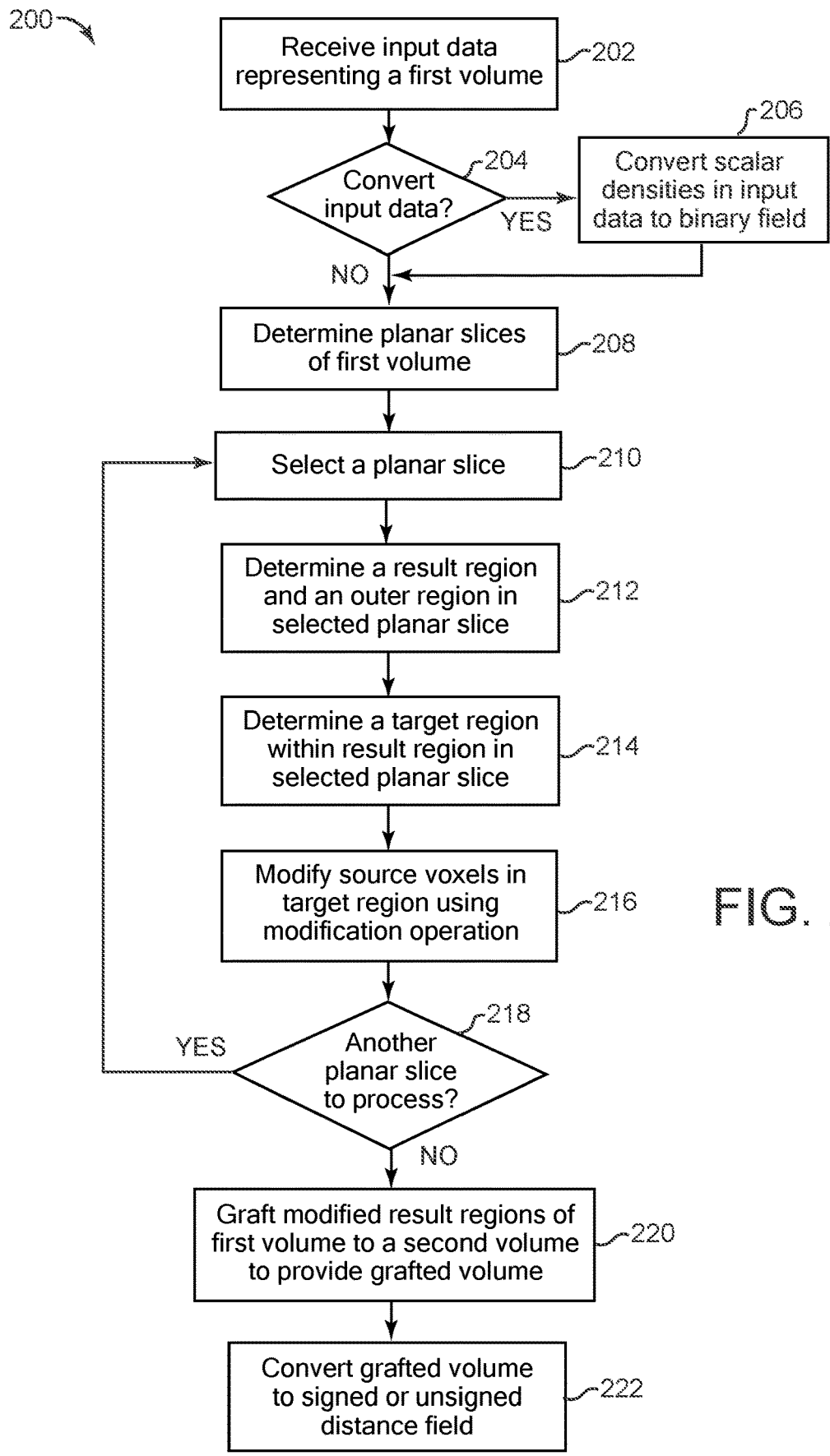
FIG. 2 is a flow diagram of an example method to provide visually seamless grafting of volumetric data, in accordance with some implementations.
Figure 6:
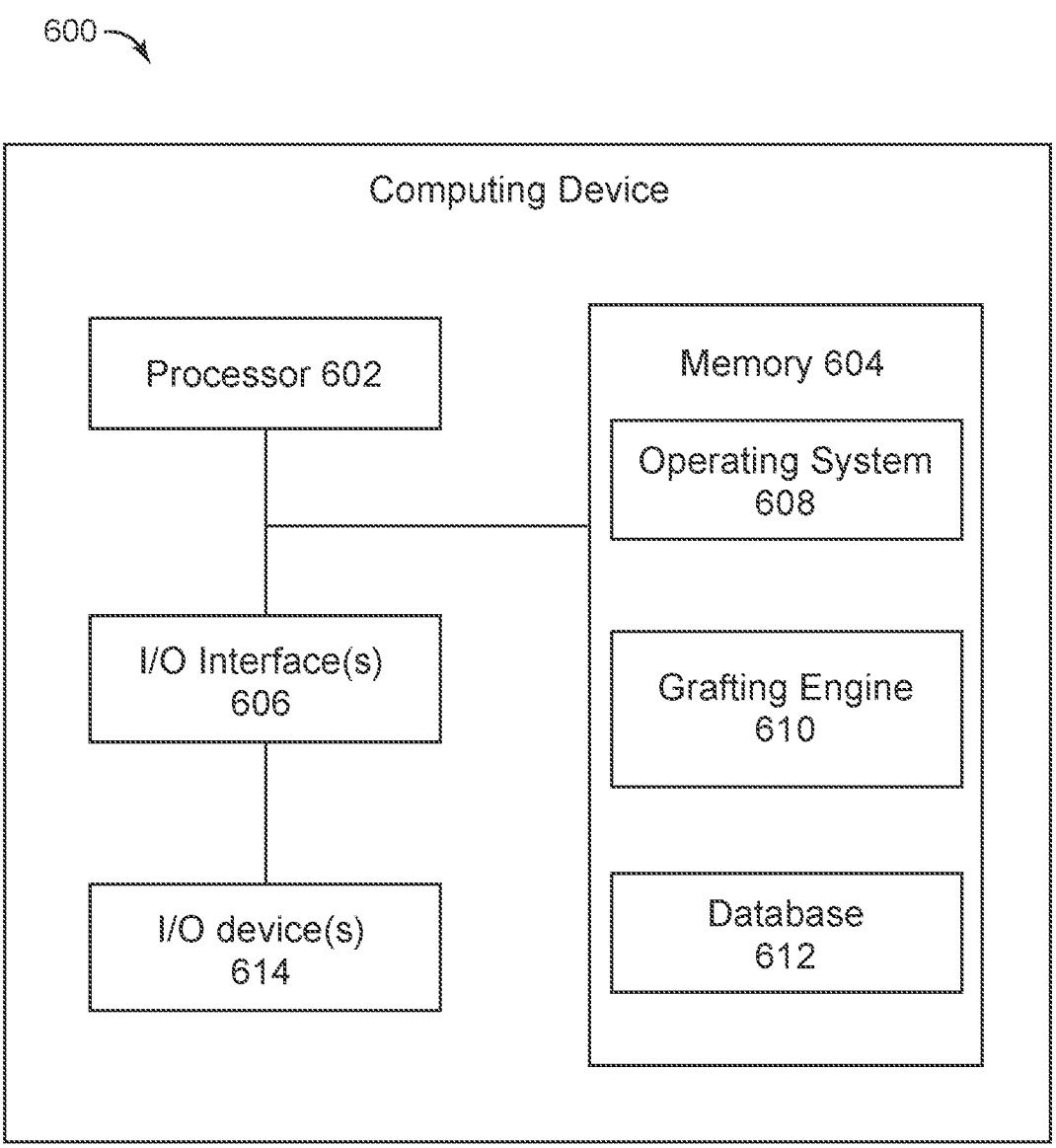
FIG. 6 is a block diagram illustrating an example computing device which may be used to implement one or more features described herein, in accordance with some implementations.

FIG. 2 is a flow diagram of an example method 200 to provide visually seamless grafting of volumetric data, in accordance with some implementations. In some implementations, method 200 can be performed, for example, on a server system, e.g., online platform 102 as shown in FIG. 1 or computing device 600 as shown in FIG. 6. In some implementations, some or all of the method 200 can be implemented on a system such as one or more client devices 110 and 116 as shown in FIGS. 1 and/or 6, and/or on both a server system and one or more client systems. In some examples, grafting of volumes as described herein may be an offline pre-process prior to deployment of resulting data, or a runtime embedded process within an application or application engine (on a server or client). In described examples, the implementing system includes one or more processors or processing circuitry, and one or more storage devices such as a database or other accessible storage. In some implementations, different components of one or more servers and/or client devices can perform different blocks or other parts of the method 200.

Method 200 may begin at block 202. In block 202, input data is received by a device or system that performs method 200. The input data includes volumetric data that represents a first volume within a 3D field. For example, the first volume can include one or more 3D objects or shapes (referred to as "objects" herein). In one example, the first volume includes multiple cloud objects that represent clouds and can be displayed in a volume representing a sky of a virtual environment. The objects can be regular or irregular shapes, polygons, objects that represent real-world objects (e.g., persons, animals, plants, vehicles, furniture, buildings or other structures, terrain features, devices, personal objects such as books, bottles, pencils, keys, etc., or portions thereof), or a wave simulation (e.g., water simulation in ocean or lake). In some implementations, the objects or shapes can include one or more surfaces (e.g., isosurfaces) that have graphical patterns such as textured surfaces, clothing patterns, etc. In some implementations, the objects can be 3D objects represented in a video game, virtual reality environment, or other virtual environment. In some examples, the objects can include an organ in a human body, an object in a particular environment (e.g., within a material or element, underground, in outer space, underwater, etc.), a geographical landscape, or other environment.

In various examples, the input data may be provided by an application program, device, or other source. For example, the input data may be provided or transmitted from a graphical editing program, a terrain editing program, constructive solid geometry application, three-dimensional (3D) modeling program, magnetic resonance imaging (MRI), X-ray or other volumetric scanner, image capture device, virtue reality (VR) or augmented reality (AR) program or device, or other source.

In some implementations or cases, the input data describes the first volume using 3D coordinates or other 3D spatial system. In some examples, the input data can define a 3D field $f(x,y,z)$ that associates with every $(x,y,z)$ location (e.g., voxel) a scalar value. In some implementations, the field's scalar values can indicate density of voxels by the first volume, creating a density field. A density value can indicate a density of the portion of an object located in that voxel (e.g., a density of a cloud object relating to the transparency or translucence of the cloud, with higher density appearing more solid than lower density). In some other examples, the input data can include scalar values that indicate an occupancy of voxels by object(s) in the first volume, where each scalar value can represent a ratio of voxel volume occupied by an object (e.g., solid material of an object), forming an occupancy field. The occupancy values may be provided in discrete voxels and can be integrals of the infinitesimal occupancy across each voxel. In some implementations or cases, each scalar value can represent an arbitrary continuous and non-distance value, or other value.

In some implementations, the field's scalar values can represent distance from a surface of an object in the first volume (e.g., the nearest object surface to the location), creating a distance field. The distance field can be signed or unsigned, where the signed distance field can indicate via one sign of scalar value (e.g., positive or negative) that the location is inside an object (e.g., the nearest object) and indicate with the opposite sign (e.g., negative or positive) that the location is outside the object. The surface of each object in the first volume can be an isosurface or level set (referred to as a "surface" herein) which is the surface for which the field has a constant value. The surface can be a continuous shape in 3D space, and distinguishes the inside and outside of an object volume. In some implementations, an isosurface threshold can be used. In some examples, a threshold of 0 (for distance and arbitrary data) and 0.5 (for occupancy data) can be used for identifying isosurfaces.

In various examples, the input data can be encoded in a variety of forms and formats, e.g., as a mathematical function, a grid of discrete voxels containing the scalar values, a point set, or any other representation, e.g., representations suitable for mapping 3D locations on the surface to values. In some cases, the input data is encoded in voxels, and an interpolation technique that produced the voxels can define the field. In some examples, the field can be interpolated using any of various techniques, e.g., via tri-linear interpolation, nearest neighbor (e.g., point sampling), or higher-order methods.

In some implementations, some forms of input data can be 3D rasterized into voxels in preprocessing, e.g., prior to method 200. For example, a voxel grid is determined for the first volume of the input data, where the voxel grid includes a plurality of voxels. In some implementations, the voxels can be cubical in shape. In some examples, a voxel grid can be imposed on the input data and then each corner of each voxel can be classified as inside or outside of one or more reference objects within the first volume. The size of the voxels in the grid can be determined based on a desired resolution, available storage, and/or other considerations. In some implementations, the input data received in block 202 may have voxels and a voxel grid that was previously encoded in the input data, and this same voxel grid can be used in method 200 such that no different voxels are determined for the input data. In some implementations, if the input data is encoded in a voxel grid, the voxel grid used for method 200 (and any of the other methods described herein) can be a different grid than the grid of the input data (e.g., a grid having a different resolution or voxel dimensions), or a dual of the grid encoded in the input data (e.g., with values considered to be at voxel corners instead of centers).

The first volume represented in the volumetric data is to be grafted to one or more other volumes. In some examples, the volume is to be tiled, such that a tile of the volume is copied and the copies are grafted to each other to cover a particular virtual space or surface. This allows a single tile of small size to be stored and processed to represent a much larger displayed volume, where the tile has a reduced size such that it can be processed quickly and stored in reduced storage space compared to larger representations of the volume. For example, such tiles are commonly used in applications such as efficient rendering of terrains, virtual environments, medical images, or objects. In further examples, the volume is to be extended, e.g., increased in size in one or more dimensions, by grafting the volume to a generated volume (e.g., an empty volume). In further examples, the volume is to be merged with a different volume, e.g., a second volume that is also represented by volumetric data of the input data. Block 202 may be followed by block 204.

In block 204, it is determined whether the input data is to be converted to another form for use in the processing of method 200. For example, in some cases, the input data may be in a form of density field data that, e.g., includes a density value for each voxel of the first volume, the density value indicating a density of an object in that voxel. In some implementations, the input data can be in a form of occupancy data which indicates an amount the voxel being occupied. In some cases or implementations, such density or occupancy data can be converted to a binary field of data that references an object in the first volume (e.g., the nearest object). In some implementations, such a binary field provides a reference format with which a signed distance field can be generated from the inside/outside boundary of the volume's media, and, for example, can provide a convenient form of data upon which to generate a tiling of a signed distance field as described below. In some cases or implementations, such density or occupancy data is not converted to another form and is processed in method 200 in its received form.

If the input data is not to be converted to another form, the method continues to block 208, described below. If the input data is to be converted to another form, the method continues to block 206, in which input data that is density data including scalar densities is converted to a binary field. For example, the binary field can indicate with 0 and 1 values whether each voxel of the first volume is located inside or outside a reference object (e.g., nearest object to the voxel) in the first volume. In some examples, the scalar density value in each voxel of the scalar density field is thresholded at a particular threshold value such that a density value above the threshold is converted to one binary value (e.g., 1) and a density value below the threshold is converted to the other binary value (e.g., 0). Occupancy values can be similarly thresholded to provide a binary field of data.

In an example, the input data can be volume density data supplied from artist or simulation tool and can be a particular size, e.g., 256×256×32 voxels, and the scalar densities in the data are to be converted into a binary field indicating nominal inside and outside locations with respect to a reference object in the volume, e.g., based on the nearest object surface to each voxel. The scalar volume field is thresholded based on the nearest object surface to create a binary field. Block 204 and/or block 206 may be followed by block 208.

In block 208, planar slices of the first volume are determined. For example, the first volume represented in the input data of block 202 can be sliced into multiple planar slices (or layers), where each planar slice includes multiple voxels in a planar configuration. In various implementations, the planar slices can have any orientation, e.g., horizontal slices that stack vertically, vertical slices that stack horizontally, or slices at other orientations. Block 208 may be followed by block 210.

In block 210, a planar slice is selected from the multiple planar slices determined in block 208. The selected planar slice has not yet been processed by method 200. For example, in a horizontal slice configuration, the topmost unprocessed slice can be selected, such that slices are processed from top to bottom of the first volume. Other orders for selection can alternatively be used. Block 210 may be followed by block 212.

In block 212, a result region and an outer region are determined in the selected planar slice. In some implementations, the result region is an inner portion of the selected planar slice and is further from one or more edges of the planar slice than the outer region. The outer region is closer to one or more edges of the planar slice than the result region. In some implementations, the outer region can be referred to as a continuity region, e.g., if voxels from the outer region are used in determining a modification of one or more source voxels in the result region as described herein. The result region is to be included in the resulting volume after being modified in process 200. Thus, the result region includes source voxels that can be modified by method 200. For example, the result regions of all the planar slices are grafted to another volume, as described below. In some implementations, the result region includes a center of the planar slice, and the outer region surrounds the result region on one or more (e.g., all) sides of the planar slice. In some example implementations, the outer region can extend a particular percentage of the distance from the edge of the planar slice to the center of the planar slice, e.g., 10% or 20% of the distance, or in other cases, 50% of the distance. Any size of outer region can be used that provides a region of variation that is sufficient to provide continued form or shape of content (e.g., objects) in the volume outside the result region. In some implementations, the outer region size and/or position can be determined based on one or more characteristics of the first volume, e.g., based on a shape of the first volume, the configuration or locations of objects within the volume, etc. In some implementations, the outer region can be made smaller for cases where the first volume is desired to retain most of its original size, e.g., in some cases where the first volume is to be merged with a different existing volume or extended. In some implementations, the outer region can be a width of zero, e.g., omitted from and not included in the planar slice.

In some examples in which the first volume is to be tiled by being grafted to one or more copies of the first volume, the result region can be considered to be a tile region, as described in the example implementation of FIGS. 4A-4D. Block 212 may be followed by block 214.

In block 214, a target region is determined that is within the result region of the selected planar slice. The target region includes voxels that may be modified by the processing of method 200. In some examples, the target region is adjacent to one or more edges of the result region, e.g., the target region is adjacent to the outer region. In some implementations, the target region is the entire result region. In some implementations, the target region is a portion of the result region and has a size less than the entire result region, such that the portion(s) of the result region that are not included in the target region are not modified by process 200. For example, the target region can be located between an interior region of the result region and the outer region, where the interior region is not modified by process 200. In some examples, the target region can completely surround the interior region of the result region. Some examples of an interior region are described below with reference to FIG. 4B. Block 214 may be followed by block 216.

In block 216, the result region is modified by updating source voxels in the target region. In some implementations, the source voxels are updated using a modification operation that modifies source voxels in the target region based on one or more inputs, to provide edges of the result region that can graft to another volume visually seamlessly. In various implementations, the inputs to the modification operation can include the values of other voxels of the planar slice (or first volume) that can inform the modification to allow a more seamless grafting of the first volume with another volume. Furthermore, in some implementations, the modification operation can be weighted such that source voxels near the edge of the result region (e.g., near the outer region) are modified by a greater amount than source voxels in the result region that are closer to the center (e.g., interior region) of the result region.

The inputs to the modification operation can be based on the volume to which the first volume is to be grafted. In some implementations, the first volume is to be tiled, such that the first volume is to be grafted to a second volume that is a copy of the first volume and, for example, the second volume may be provided in the same orientation as the first volume. In this tiling example, a first edge of the first volume can be connected to a second edge of the second volume, where the second edge of the second volume is the same as a second edge of the first volume that is opposite to the first edge of the first volume. Thus, modifying the target region of the first volume can be based at least on reference voxels that are located on the opposite edge of the first volume to the voxels that are being modified. In other examples, the first volume may be extended by being grafted to a second volume that is a generated volume, or the first volume may be grafted to (merged with) a second volume that is different than the first volume (e.g., the second volume is not a copy of the first volume as in the tiling example, and may be different in one or more characteristics such as size, shape, color, etc.). In these latter two extension or merging examples, the reference voxels on the opposite edge of the first volume may not be needed and thus need not be input to the modification operation.

Some examples of a modification operation are described below with reference to FIG. 3. Block 216 may be followed by block 218.

In block 218, it is determined whether there is another planar slice of the first volume to process. If so, the method returns to block 210 to select another planar slice to process. If there are no further planar slices of the first volume to process at block 218, then the method continues to block 220.

In block 220, the modified result regions of the first volume are combined into a modified first volume and the modified first volume is grafted to a second volume to provide a grafted volume (e.g., merged volume). For example, the grafted volume has a visually seamless connection between the first and second volumes. In some examples, the modified result regions of the planar slices of the first volume can be stacked or otherwise combined together to form the modified first volume that does not include the outer regions of the planar slices, and the modified first volume is grafted to the second volume.

The second volume can be any of a variety of volumes. For example, in implementations that provide tiling of the first volume, the second volume can be a copy of the modified first volume and is grafted to an edge of the modified first volume. In some examples, the second volume can be a copy that is unchanged in orientation relative to the modified first volume, e.g., a copy that is placed so that its first (e.g., left) edge is grafted to the opposite (e.g., right) edge of the modified first volume. In some implementations, the modified first volume is further tiled, e.g., a third volume is provided as a copy of the first volume or second volume and is grafted to the second volume (or to the modified first volume), and so on with copies made of the first volume or copy thereof and grafted to a side of the first volume or copy volume.

In some implementations, the second volume can be a copy of the modified first volume but can be rotated and/or otherwise changed in orientation so that a different edge of the second volume is grafted to an edge of the modified first volume. For example, in some of these implementations, the opposite voxels of the planar slices of the first volume may not have contributed to the modification operation of the target regions in block 216.

In some implementations, the second volume can be a different volume than the modified first volume. For example, if the first volume is a cloud object, the second volume can be a different cloud object that is grafted seamlessly to the first cloud object in block 220. In some of these implementations, voxels of the different cloud object may have contributed to the modification operation of the result regions in block 216, e.g., as continuity voxels.

In some implementations, the second volume can be a volume that is generated and used to extend the modified first volume. For example, the second volume can be generated by process 200 prior to block 220 as an empty volume that is grafted to the modified first volume. Example implementations of the modification operation are described below with respect to FIG. 3. Block 220 may be followed by block 222.

In block 222, in some implementations, the modified first volume that includes the modified result regions of the planar slices from block 216, and/or the grafted volume determined in block 220, can be converted to signed or unsigned distance field data. For example, if the input data has been converted to binary field data in block 206, the binary field data can be converted to distance field data in block 222 after modification in blocks 216 and/or 220. For example, the binary field provides a reference format with which a signed distance field can be generated from the inside/outside boundary of the volume's object(s), and thus provides a convenient form of data upon which to generate a signed distance field. For example, the distance field can include a value in each voxel that indicates the distance of the voxel to the surface of a reference object in the modified or grafted volume (such as the nearest surface of the nearest object), and can indicate whether the voxel is within the reference object or outside the object using signed values (e.g., one sign for inside the object, the opposite sign for outside the object). An unsigned distance field can also or alternatively be generated that, e.g., does not include the inside/outside information.

In some implementations, determined distance field values can be wrapped across boundaries of copied tiles or other modified volumes. In some examples, the determined distance values can represent distances to a nominated surface of the first volume, where that surface may correspond to the volume's density values (e.g., density values in the input data may have been converted to a binary inside/outside density field that refers to the surface, as described above). These distance values can be determined to ensure that the distance values across wrapped edges of tiles (e.g., across the graft boundary of the grafted edges) are maintained correctly. For example, in some cases, discontinuities in the distance values may be present if there is no surface (or no near surface) at one of the edges of the tile, such that the nearest surface to a location on one tile (e.g., at a tile edge) may be across the graft boundary on a grafted tile. In some implementations, to avoid such discontinuities, one or more distance values can be based on a distance wrapped across a graft boundary to the surface on the grafted tile that is the nearest surface, to maintain correct distance values. In some examples, these distance values can be determined using a one-dimensional row technique or algorithm. In some examples, the distance value at such a location on a first tile (e.g., on or near the tile edge) can be determined based on a wrapped distance that is a distance from that location to the nearest tile edge of the first tile, plus a distance on the second (grafted) tile from the tile edge to the nearest surface on the second tile. In some implementations, a similar determination can be used for distance values describing two grafted volumes that are not repeated tiles. In some implementations, these techniques can be implemented based on an extension to a linear-time distance parabola tracking algorithm that uses distance transforms, e.g., the algorithm can be extended to maintain nearest feature tracking based on the wrapped distance as described above.

In some implementations, the grafted volume can be stored in a database (e.g., data store 108 or other memory or data storage) and retrieved for display by an application providing a virtual environment, game, simulation, etc. In some implementations, the grafted volume is displayable by a display device. For example, the grafted volume can be rendered within a 2D or 3D virtual environment, game, or other application.

Figure 3:
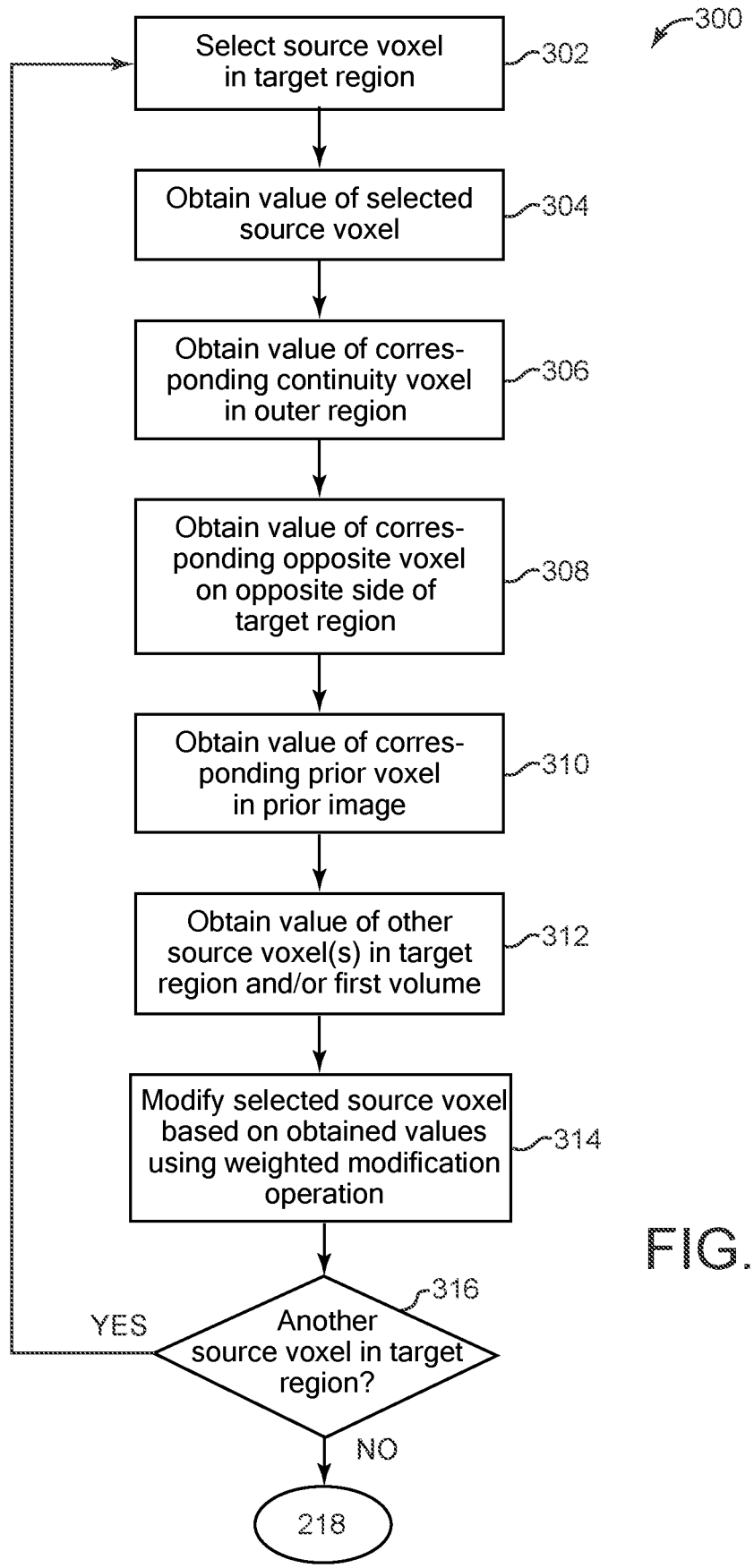
FIG. 3 is a flow diagram of an example method to perform a modification operation to update source voxels in a target region of a planar slice of a volume, in accordance with some implementations.

FIG. 3 is a flow diagram illustrating an example method 300 to perform a modification operation to update source voxels in a target region of a planar slice of a volume, according to some implementations. For example, method 300 can be an example implementation of the modification operation of block 216 of FIG. 2 to update source voxels in a target region of a selected planar slice. Similarly to method 200, some or all of method 300 can be performed, for example, on a server system, one or more client devices, and/or on both a server system and one or more client systems.

In block 302, a source voxel is selected in the target region that is being processed. For example, the target region can be a region in a result region of a planar slice as described above with reference to FIG. 2. In some implementations, the source voxel can be selected based on a predetermined order, e.g., the next source voxel in a horizontal row or vertical column across the target region or in a portion of the target region, and moving to a next (e.g., adjacent) row of voxels in the region (or portion thereof) after a current row is fully processed. Other processing orders can be used in other implementations. Block 302 may be followed by block 304.

In block 304, a value of the selected source voxel is obtained. For example, each source voxel can be associated with a voxel value. In some implementations, for example, the input data may be in a binary form (e.g., possibly converted from a different form as described with reference to block 206 of FIG. 2), and the voxel value has one of two possible values (e.g., 0 or 1). In some implementations, the source voxels may have any of a range of values within a particular range, e.g., representing distance to a reference object surface, a density of an object in that voxel, an amount of occupancy of that voxel by an object, etc. Block 304 may be followed by block 306.

In block 306, a value(s) of one or more corresponding continuity voxels are obtained. A continuity voxel is located in the outer region of the currently-processed planar slice, which can be referred to as a continuity region in some implementations. A continuity voxel is associated with and corresponds to the selected source voxel. For example, the continuity voxel can have a location in the outer region that corresponds to the location of the source voxel in the target region. In some examples, the corresponding location is a location across (on the other side of) the closest edge of the target region to the selected source voxel. The corresponding location is also aligned with the selected source voxel, e.g., the continuity voxel and selected source voxel are intersected by a line that is perpendicular to the closest edge of the target region. The corresponding location is also in the outer region at a distance from the closest target region edge that is the same as a distance of the selected source voxel from the closest target region edge in the target region. The corresponding continuity voxel can inform the modification operation how voxels should appear on the other side of the edge of the result region.

In some implementations, the continuity voxel can be at other locations within the outer region. For example, a different continuity voxel location in the outer region can be used in a case of a grafted volume being under a spatial warp for animation of combinations of different resulting poses described with volume deformations that maintain a shared reference world space. In some implementations, a value can be obtained of a continuity voxel that is in another location. For example, in a case where the first volume is to be merged with a different second volume, a continuity voxel can be located in the second volume and is aligned with the selected source voxel along an axis of merging (e.g., aligned along a line that intersects the selected source voxel and the continuity voxel and is perpendicular across the grafting edge). For example, such a continuity voxel can be the same distance from the merging edge of the second voxel as the distance of the selected source voxel from the merging edge of the first volume. In another example, in a case where the first volume is to be extended, a second volume can be generated and filled with a portion of the first volume voxels or other voxels. A continuity voxel can be located in the generated second volume that is similar to the continuity voxel in the second volume of the merging case described above. Some examples of continuity voxels are described below with respect to FIG. 4B. Block 306 may be followed by block 308.

In block 308, a value of a corresponding source voxel on the opposite side of the target region is obtained (an "opposite voxel"). For example, the location of the voxel on the opposite side can be on or near an opposite edge of the target region that is opposite the nearest edge of the target region to the selected source voxel. In some implementations, the opposite voxel is within the target region and aligned with the selected source voxel (e.g., the opposite source voxel and selected source voxel are intersected by a line that is perpendicular to the edge of the target region closest to the selected source voxel), and is on an opposite side of the target region at a distance from the opposite target region edge that is the same as a distance of the selected source voxel from the closest target region edge. The value of this opposite voxel can inform the modification of the voxel to indicate the voxel value at the opposite side of the target region, since the opposite edge of the target region can be included in a tiled copy of the result region that is grafted to the closest edge of the target region. In some implementations or cases, the opposite voxel value may not be needed nor obtained, e.g., if the first volume is to be extended, merged with a different volume, or tiled with differently-oriented copies of itself. Some examples of opposite voxels are described below with respect to FIG. 4B. Block 308 may be followed by block 310.

In block 310, a value of a corresponding prior voxel is obtained from a prior slice. In some implementations, the prior slice can includes voxels that represent one or more objects (or a pattern of such objects) generated by a shaping function. A shaping function, as referred to herein, is a function or technique that can generate one or more objects, or a pattern of objects, that are similar in size, shape, and/or distribution to one or more objects in the first volume. In some examples, the first volume can include multiple objects that are distributed through the volume in an approximate pattern. The shaping function can generate a volume (or a 2D planar slice) having similar objects in a similar pattern that is not identical to the pattern and/or objects in the first volume. The shaping function and prior slice provide objects and object patterns that indicate generally how a similar volume appears, and thus can be used to provide references to the modification operation to indicate how a seamless connection to the grafted first volume should appear. In various implementations, the method 200 or method 300 can generate the prior slice (e.g., prior to block 310), or the prior slice can be generated by a different method, e.g., prior to or concurrently with block 310.

For example, in some implementations the first volume has been generated using a function. In some examples, the objects in the first volume may have been generated by a noise function, e.g., a Perlin noise function or a Worley noise function that can be used to generate procedural textures simulating objects or patterns such as stone, water, clouds, or biological cells. For example, a Perlin noise function is a layered noise function using successive power of two frequencies in three dimensions. It can be used to generate an image with a center or interior area masked out (e.g., the same size as an interior region defined for the defined planar slices of the first volume). In some examples, if the first volume includes multiple clouds as objects, the clouds may have been generated using a noise function or other function. The shaping function can be this noise function, and the prior slice can be a 2D slice of a volume that has been generated with the same noise function (e.g., with slightly different inputs or parameters). In another example, the shaping function can be a function that is simplified compared to the noise function or other function that generated the first volume, and is sufficient to provide a seamless graft. Alternatively, the shaping function can be a 2D function that generates objects or object pattern in a 2D image that is used as the prior slice.

In another example, in some implementations, the prior slice can be generated using a machine learning model (e.g., deep learning model) that has been trained with training data that represents volumes similar to the first volume. For example, the training data can include samples of objects and/or patterns of objects that are similar in size, shape, and/or pattern to the objects in the first volume. The machine learning model can produce inference output based on this training data, e.g., objects and/or patterns of objects that are not identical but have similar (e.g., approximately the same) characteristics of shape, size, and/or distribution of objects within a volume. In some examples, if the first volume is generated by or similar to patterns generated by a particular function, the training data for the machine learning model can include volumes generated by that function (e.g., with diverse random seeding or other variation so that the volumes are not identical). In an example in which the first volume includes cloud objects, training data can include a similar pattern of smooth (or sharp) transitions from a database of cloud objects. The training data can include a large number of samples, e.g., depending on the training method used, or the model can be adaptively trained (e.g., using active learning). In some implementations, the adaptive training and processing can be performed on a server and/or on a client device.

The corresponding prior voxel can be a voxel that is in a location of the prior slice that corresponds to the location of the selected source voxel in the selected planar slice. For example, the prior slice can be the same size as the result region of the planar slice of the first volume, and the prior voxel can be at the same relative coordinates in the prior slice as the coordinates of the selected source voxel in the result region. In other implementations, the prior voxel can be at other location in the prior slice. Some examples of prior voxels are described below with respect to FIGS. 4B and 4C. Block 310 may be followed by block 312.

In block 312, values of one or more other source voxels are obtained. The other source voxels can be previously modified by method 300, and/or can be unmodified by method 300. In some examples, the one or more other source voxels are adjacent to the selected source voxel. In some implementations, the adjacent source voxels can include the previous source voxel that was modified by method 300, and/or can include one or more unmodified adjacent source voxels, e.g., the next source voxel to be processed in a current row of voxels, a source voxel in an adjacent row or column of voxels, etc. In some implementations, the other source voxels can include voxels in other parts of the selected planar slice and/or in other planar slices of the first volume. For example, in some implementations, voxels of the first volume can be pre-filtered for each source voxel. For example, a group of voxels in the first volume can be determined for each source voxel (e.g., as preprocessing prior to block 312, where the voxels in the group are included in the same object that the source voxel is included in; this group of voxels can be used as the other source voxels obtained in block 312. The values of other source voxels can be stored in a working buffer or memory for use or access by block 312 and/or block 314. The other source voxels obtained in block 312 inform the modification operation of other voxel values in the original volume and/or pattern of objects in the first volume.

In some implementations, the value(s) of other source voxels can also or alternatively be obtained in block 312, e.g., form a different portion of the selected planar slice or first volume, etc. Block 312 may be followed by block 314.

In block 314, one or more of the values obtained in blocks 304 to 312 are provided as inputs to a modification operation that modifies the selected source voxel. The modification operation updates source voxels in the target region based on the one or more inputs, and removes the outer region of the selected planar slice, to provide the edges of the result region as an edge of the first volume that can graft to other volumes visually seamlessly. In some implementations, the modification operation is weighted based on a distance of the selected source voxel to the nearest edge of the target region, such that source voxels near the edge of the result region (e.g., near the outer region) are modified by a greater amount than source voxels in the result region that are closer to the interior region (or center) of the result region that is unmodified.

Any one or more of the inputs of blocks 306-312 can be obtained and input to the modification operation in various implementations. For example, the inputs to the modification operation can be based on the volume to which the first volume is to be grafted. In some implementations, the first volume is to be tiled such that the first volume is to be grafted to a second volume that is a copy of the first volume and is in the same orientation. In this case, use of the opposite voxel value of block 308 can be appropriate. For example, all of the input values from blocks 304 to 312 can be provided to the modification operation in such a case, or a subset of these input values.

In some implementations, the first volume is to be extended, e.g., stretched in one or more dimensions. In some implementations, the second volume is an extension volume that is generated by process 200 or 300 and this second volume is grafted to the first volume to extend it. For example, the second volume can be created as an empty volume that has a size equal to the amount of extension desired (e.g., half the length of the first volume if the first volume length is to be extended by 50%). A planar slice of the empty volume (e.g., that corresponds to the selected planar slice) can be filled with, for example, copies of voxels from the first volume, or voxels generated by a shaping (or other) function that generated the first volume or generates volumes similar to the first volume. In some of these implementations, one or more continuity values from block 306 can be used in the modification operation, e.g., one or more continuity voxels from the outer region of the selected planar slice and/or from the generated extension volume as described for block 306. Values can also be provided from block 310 (prior voxel) and block 312 (other voxel) to the modification operation. In some of these implementations, the opposite voxel value of block 308 is not needed. In some of these implementations, a subset of the values from blocks 306-312 are used by the modification operation.

In some implementations, the first volume is to be grafted to a second volume that is different than (e.g., not a tiled copy of) the first volume. In some of these implementations, one or more continuity values from block 306 can be used in the modification operation similarly to the extension case. For example, one or more continuity voxels from the outer region of the selected planar slice and/or from the second volume can be used as described for block 306. Values can also be provided from block 310 (prior voxel) and block 312 (other voxel) to the modification operation. In some of these implementations, the opposite voxel value of block 308 is not needed. In some of these implementations, a subset of the values from blocks 306-312 are used by the modification operation.

The modification operation modifies the selected source voxel based on one or more of the input values described above. In some implementations, the modification operation is a function that selects one of the input voxels based on one or more characteristics of the selected source voxel, where the characteristics can include the distance from the nearest outer edge of the target/result region. In some implementations, for example, the modification operation for a tiling volume example can use the following equation:

$$V_{dst} = \begin{cases} V_{cont}, & \text{if } \omega > V_{prior} \\ \min(V_{src}, V_{ref}), & \text{if } \omega \leq V_{prior} \end{cases} \text{ where } \omega = \sqrt{d}$$

$V_{dst}$ is the resulting voxel value from the modification operation, and w is the square root of d that is the distance of the selected source voxel to the nearest outer edge of the target region (e.g., the edge that is to be grafted). In some implementations, the distance d can range between 0 to the distance in voxels to the interior region away from the grafted edge, in a chosen distance metric (Cartesian distance, Manhattan distance, etc.). Thus, w increases slowly and nonlinearly (curved) with greater distance of the selected source voxel from the target region edge. $V_{dst}$ is determined to be the value of the continuity voxel if w is greater than the prior voxel value, and $V_{dst}$ is determined to be the minimum of the source voxel value and the opposite voxel value if w is less than or equal to the prior voxel value. Thus, the selected source voxel is modified to be the continuity voxel if the selected source voxel is at an edge distance that is greater than the result of the shaping function (indicated by the prior voxel), and is modified to be the smaller value of the selected source voxel and the opposite voxel otherwise. Thus, the modification is based on weighted distance (weighting that is nonlinear/curved in this example) from the tiling edge, creating a tapered modification of the selected source voxel, where the prior voxels steer the operation to select either the continuity voxel or the minimum of the source voxel value or the opposite voxel value. This causes the modified source voxel to take the value of the continuity voxel when closer to the edge and take the value of the opposite voxel (or not be changed) further from the edge. For example, the natural existing extension of the modified volume as indicated by the continuity voxels, can be mixed with a combination of the expected wrapped values from the opposite side of the tile, and the original source voxels.

In another example of a modification operation, the corresponding prior voxel of the prior slice can be used to determine which value is used for the source voxel. For example, if the prior voxel has a particular value or range (such as a binary value of 1), keep the source voxel unchanged; and if the prior voxel has a different particular value (e.g., a binary value of 0), modify the source voxel to be the same as the minimum (lowest value) among the corresponding continuity voxel, corresponding opposite voxel, and source voxel.

Various other different equations or combinations of voxel values can be used in the modification operation in other implementations. For example, the other (e.g., adjacent) voxel value from block 312 can be used, e.g., instead of or in addition to the continuity voxel, or the other voxel value can be combined with the prior voxel that is provided by a shaping function or a trained machine learning model.

In some implementations, the source voxel processed by block 314 is stored in a working buffer that stores all processed source voxels of the selected planar slice and the other planar slices of the first volume. This buffer can store the complete modified volume after all planar slices are processed. Block 314 may be followed by block 316.

In block 316, it is determined whether there is another source voxel in the target region to process. If there is another source voxel to process, the method continues to block 302 to select an unprocessed source voxel in the target region. In various implementations, the source voxels in the target region can be processed in particular orders or directions and/or can be processed in one portion of the target region, then another portion of the target region, etc. For example, in some implementations, source voxels can be processed row by row and/or column by column, such that a row of source voxels in the target region is processed before a next adjacent row of source voxels is processed. In some of these implementations, the next source voxel selected in block 302 can be the next source voxel in the current row of source voxels; if the last source voxel of the current row has been processed, then an unprocessed source voxel in an adjacent row can be selected, e.g., the first unprocessed voxel in an adjacent row.

In some implementations, e.g., some examples that use a square target region having an interior region (e.g., see FIG. 4B), the target region can be delineated into two horizontal portions and two vertical portions, where the two horizontal portions extend across the top and bottom areas of the target region and the two vertical portions extend across the left and right areas of the target region. In some examples, horizontal rows of voxels in the first horizontal portion, horizontal rows of voxels in the second horizontal portion, vertical columns of voxels in the first vertical portion, and vertical columns of voxels in the second vertical portion can be processed as groups, e.g., in any order. If any processed portions overlap (e.g., at corners in the example above), processing in the overlapped portions can ignore one set of voxels such that each source voxel in overlapped portions is processed once and not multiple times. Other patterns or orders of processing voxels in the target region can be performed in other implementations.

If there are no further source voxels to process in the target region of the current planar slice, then the method 300 continues other processing, e.g., to block 218 of FIG. 2 to determine if there is another planar slice of the first volume to process.

FIGS. 4A-4D are diagrammatic illustrations of an example implementation to provide a modified planar slice suitable for grafting, according to some implementations. In some examples, the described implementation of FIGS. 4A-4D can be provided using method 200 and method 300 described herein. For example, a device can perform the processing described with reference to FIGS. 4A-4D, e.g., a server device or client device.

Figure 4A:
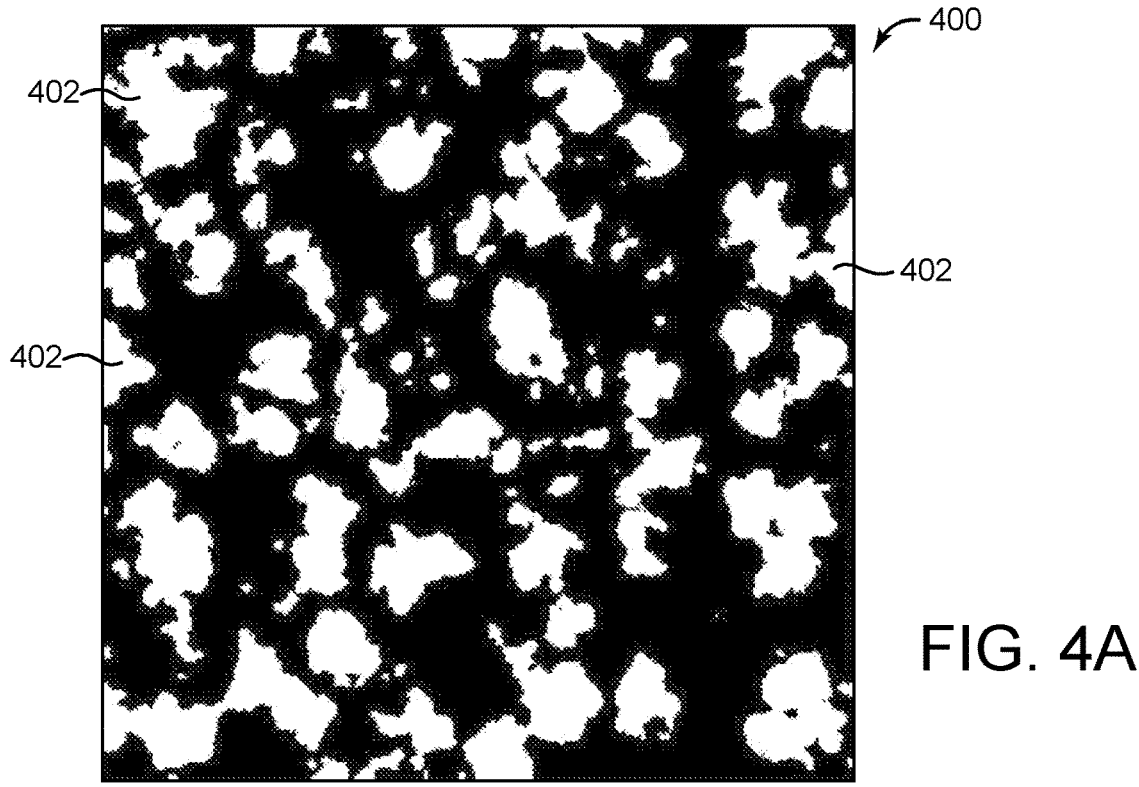
FIGS. 4A-4D are diagrammatic illustrations of an example implementation to provide a modified planar slice suitable for grafting, in accordance with some implementations.

FIG. 4A shows an example planar slice 400 of voxels that has been extracted from a first volume described in obtained input data. The first volume includes one or more 3D objects or shapes, portions of which are shown as objects 402 in planar slice 400. In this example, the first volume is a cubic volume such that planar slice 400 is a square. Other volume and planar slice shapes can be used in other implementations. In this example, objects 402 are clouds, and the first volume includes several clouds. In some examples, the clouds can be provided within a sky region or other region of a virtual environment or computer game implemented by a device. The first volume is desired to be tiled so that the cloud shapes within the first volume can be expanded across the sky region by copying the first volume and grafting the copies to one or more other copies. This allows the first volume to be stored without having to store additional data, while allowing cloud shapes of the first volume to be provided across a volume (such as a sky representation) that is larger than the first volume.

In this example, planar slice 400 has been converted from density data to a binary field. For example, scalar density values in the input data can be thresholded to determine binary values in the binary field. In this example, the lighter voxels represent cloud shapes and the darker voxels represent empty space between the cloud shapes. In some implementations, additional thresholds can be used to provide additional levels of quantization of the original scalar values; for example, such multiple levels can be represented as one or more shades of grey in addition to black and white.

Figure 4B:
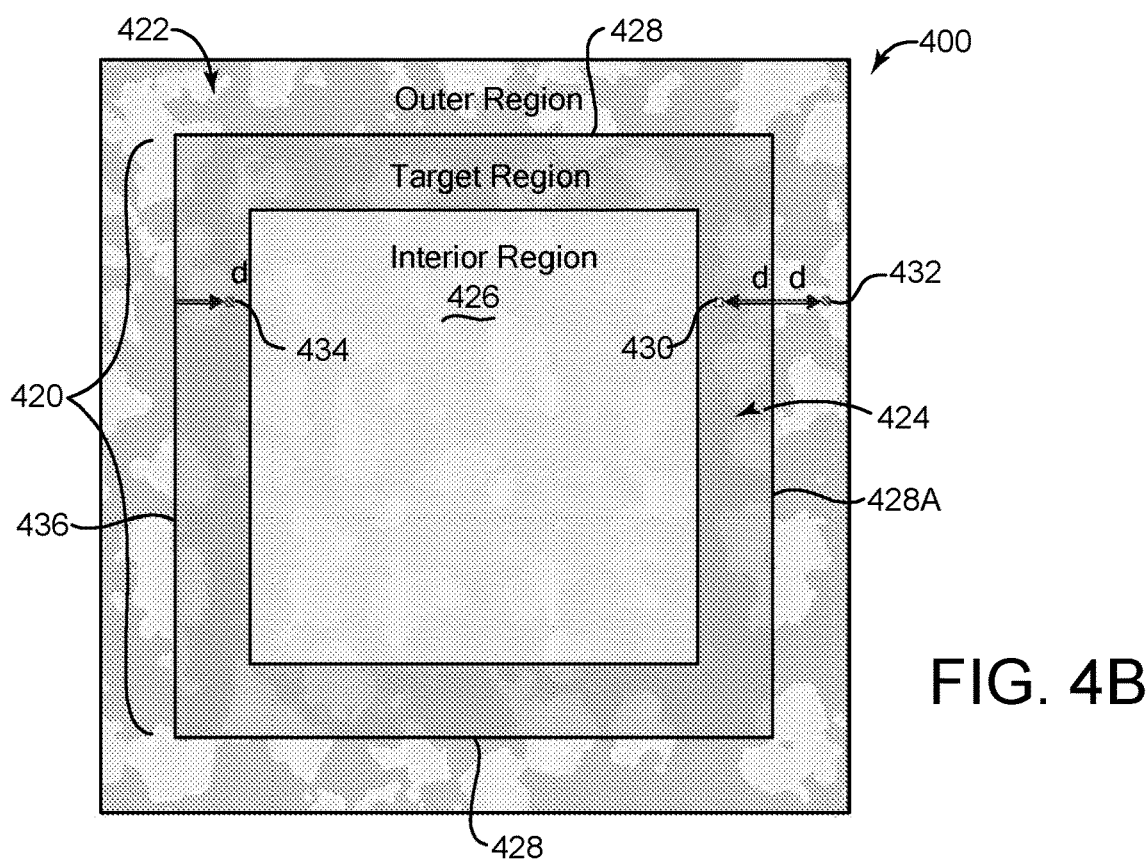

FIG. 4B is an illustration of the planar slice 400 of FIG. 4A that has been divided into different regions for processing as described above in methods 200 and 300. In this example, planar slice 400 is delineated into a result region 420 and an outer region 422 (which also can be referred to as a continuity region). Result region 420 is further divided into a target region 424 and an interior region 426. As described herein, result region 420 defines a planar slice of resulting tile volume, where edge 428 is the tiling edge of the resulting tile volume. Result region 420 includes source voxels that are modified by processes described herein. In a modified result region that is provided as a resulting tile, one or more voxels in target region 424 are modified to enable seamless tiling of result region 420. The voxels of interior region 426 are not modified. Outer region 422 is not included in the resulting modified result region (tile), but its voxel values can inform the modification of source voxel values in the target region as described herein.

In this example, outer region 422 extends from the entire perimeter (outer edges) of the planar slice 400 and across a distance toward the center of the planar slice until it reaches the target region. In some implementations, outer region 422 can be determined to extend a particular distance from each edge of the planar slice to the target region, e.g., any of 20% to 30% of a distance from the slice edge to the slice center. Similarly, in this example, target region 424 extends from the inner border of the outer region on all sides of the planar slice 400 across a distance toward the center of the planar slice until it reaches interior region 426. In some implementations, target region 424 can be determined to extend a particular distance from each interior edge of the outer region to the interior region, e.g., any of 20% to 30% of a distance from the edge of the planar slice to the center of the planar slice. In some examples, planar slice 400 can have a size of 320×320 voxels, target region 424 can have size of 256×256 voxels, and interior region 426 can have a size of 192×192 voxels.

In addition, FIG. 4B shows an example selected source voxel 430. For example, selected voxel 430 can be a voxel within the target region 424 that is currently being modified (or analyzed for modification). Each voxel in the target region can be similarly selected and modified in previous or later iterations of the modification process. In some implementations, a row of voxels can be processed in sequence, e.g., a horizontal row of voxels in the target region in a particular direction (e.g., left to right), followed by the next horizontal row of voxels in the target region (e.g., the next lower row), etc. In some implementations, a vertical row (e.g., columns) of voxels in the target region can be processed in a particular direction (e.g., top to bottom), followed by the next vertical row of voxels in the target region (e.g., the next vertical row to the right of the current row).

Selected source voxel 430 is located at a distance d from the nearest outer edge of the target region 424, which is edge 428A. In some implementations, the modification of selected voxel 430 is additionally based on an associated continuity voxel in outer (continuity) region 422. For example, the continuity voxel is located in the continuity region at a distance from the nearest edge of the result region that is the same as a distance of the selected source voxel in the result region from that nearest edge. In this example, the continuity voxel associated with selected source voxel 430 is continuity voxel 432 that is located in the continuity region 422 at a distance d from the nearest edge 428A of result region 420 (e.g., the right vertical edge of the result region in FIG. 4B). This distance d is the same distance d that selected source voxel 430 is located from edge 428A. The associated continuity voxel 432 is aligned with selected voxel 430, e.g., horizontally aligned as indicated by a line (not shown) that intersects the two voxels and is perpendicular to edge 428A to the selected source voxel 430.

In some implementations, the modification of selected source voxel 430 is additionally based on an associated opposite voxel in target region 424 that is located on an opposite side of target region 424 to where the selected source voxel is located. For example, the opposite voxel can be located in the target region at a distance from the opposite edge of the result region that is the same as a distance of the selected source voxel from the nearest edge of the result region. The opposite edge is the edge of the target region (and result region) that is opposite to the nearest edge to the selected source voxel 430, e.g., where the left edge is opposite to the right edge, the bottom edge is opposite to the top edge, etc. In this example, the opposite voxel associated with selected source voxel 430 is voxel 434 that is located in the target region 424 on the opposite side of the target region at a distance d from the opposite nearest edge of the result region (edge 436). The distance d is the same distance that selected source voxel 430 is located from nearest edge 428A. The opposite side in this example is the left side of the target region, since selected voxel 430 is on the right side of the target region. The associated opposite voxel 434 is horizontally aligned with selected voxel 430, e.g., as indicated by a line (here, a horizontal line, not shown) that intersects the two voxels and is perpendicular to the nearest edges 436 and 428A to the opposite voxel 434 and the selected source voxel 430, respectively.

In some implementations, the modification of selected source voxel 430 can be additionally based on one or more other source voxels in target region 424 that are, for example, adjacent to the selected source voxel. For example, the adjacent voxels can be located in the target region 424 adjacent to the selected source voxel 430, and/or can be adjacent in other planar slices. In some implementations, adjacent target voxels can be stored in a working buffer which stores modified voxels of the target region.

In some implementations, the modification of selected source voxel 430 is additionally based on the distance d of the selected source voxel 430 to the nearest outer edge of the target region 424. For example, the weight of the various voxel inputs to the modification can be based on this distance, as described in some examples with reference to FIG. 3.

Figure 4C:
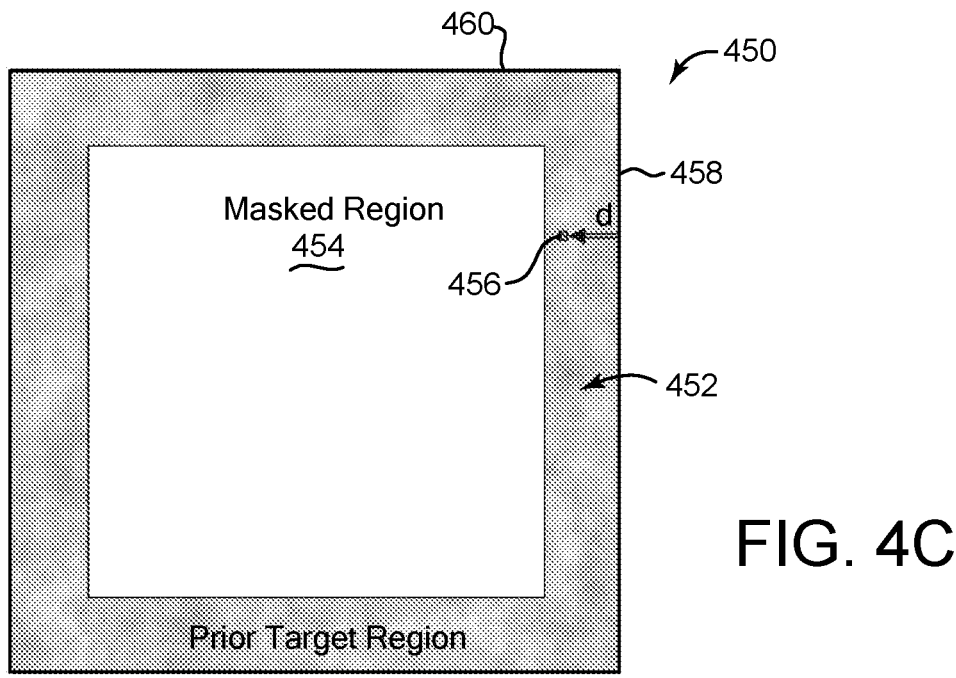

FIG. 4C is an illustration of a prior voxel slice 450 generated by a shaping function and that can be used to provide prior voxel values for use in determining modifications to voxels of the target region 424 of the planar slice 400 shown in FIG. 4B. Prior slice 450 can be depict one or more objects similar to the planar slice. In some examples, prior slice 450 can be generated using a same function or process that created the planar slice 400 of the volume that is to be tiled. In this example, prior slice 450 has been created by a shaping function that is a Perlin noise function that generates patterns similar to the pattern of cloud objects in planar slice 400. For example, the shaping function can be a layered noise function using successive power of two frequencies in three dimensions.

Prior slice 450 is divided into different regions that correspond with one or more regions of the planar slice that is being modified. In this example, prior slice 450 is divided into a prior target region 452 that corresponds to the target region 424 of planar slice 400, and a masked region 454 that corresponds to interior region 426 of planar slice 400. The dimensions of prior slice 450 are equal to corresponding dimensions of the result region 420 (and outer dimensions of target region 424) of planar slice 400. The dimensions of masked region 454 are equal to corresponding dimensions of interior region 426 of planar slice 400.

In some implementations, when modifying a selected source voxel in the target region 424 of the planar slice 400, the modification can be additionally based on a prior voxel, in a prior slice, that corresponds to the selected source voxel. In this example, a value of prior voxel 456 can be used in the modification of selected source voxel 430 of FIG. 4B. Prior voxel 456 corresponds to selected source voxel 430 and, for example, is located on the same side of the target region as the selected source voxel 430 (e.g., the right side in this example), and is located at a distance from the edge of prior target region 452 that is the same as a distance d of the selected source voxel from the edge of result region 420 in planar slice 400. In this example, prior voxel 456 corresponds to selected source voxel 430 also by having the same horizontal position with respect to the nearest vertical edge (here, right edge 458, at distance d) and the same vertical position with respect to the nearest horizontal edge (here, top edge 460). In some implementations, the values of other prior voxels of prior slice 450 can be used, and/or multiple prior voxels of prior slice 450 can be used, in the modification of the selected source voxel 430.

Figure 4D:
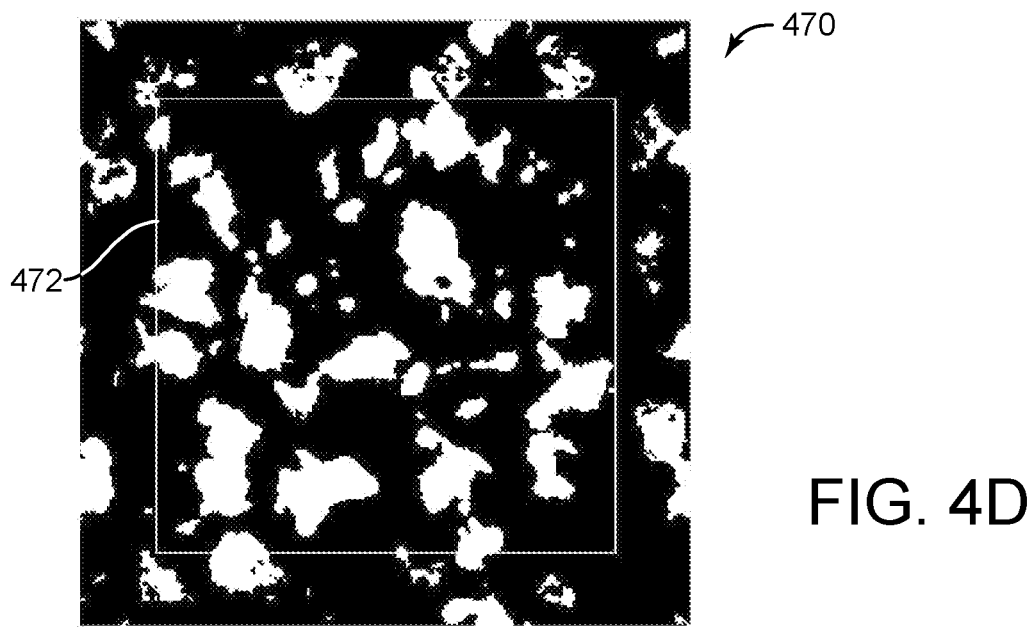

FIG. 4D is an illustration of a modified result region 470 (e.g., tile) that has resulted from updating one or more source voxels in target region 424 of planar slice 400 based on the other values as described herein. For example, the source voxels in the target region can be modified similarly as described in block 314 of FIG. 3. A border 472 is shown in FIG. 4D to indicate the location corresponding to interior region 426 of planar slice 400. The voxels of modified result region 470 have been modified so that modified result region 470 can be tiled in any direction, e.g., grafted to copies of the modified result region 470 in any direction, with seamless transitions between the modified result regions. For example, modified result region 470 (or a modified volume of which it is a part) can be copied as a second result region (or volume), the second result region is shifted to the right so that its left edge is adjacent to the right edge of the modified result region 470, thus grafting the two modified result regions as a combined, single region. The borders of these result regions have been modified so that the right edge of one result region joins seamlessly with the left edge of the other result region without any visual discontinuities, and the pattern of cloud objects is maintained so that none of the objects looks out of place in the overall cloud pattern in the grafted combined region.

Figure 5A:
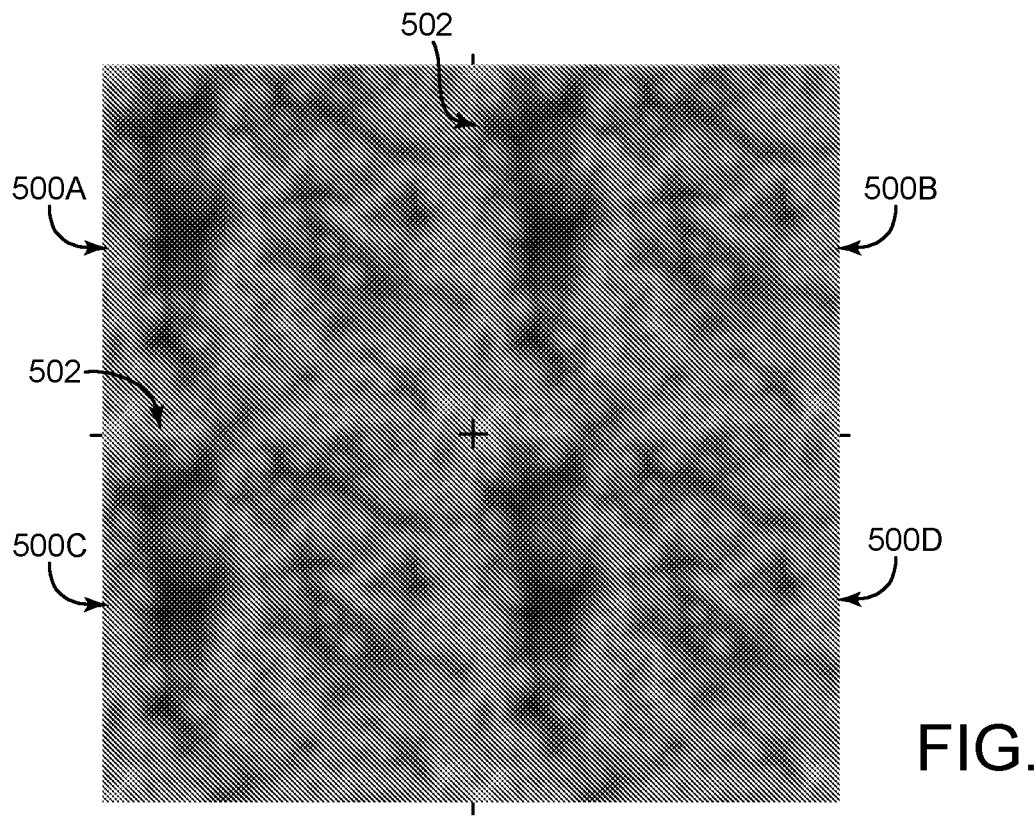
FIGS. 5A-5B are diagrammatic illustrations of example tiled regions of voxels that have been, respectively, unmodified and modified by one or more techniques described herein, in accordance with some implementations.
Figure 5B:
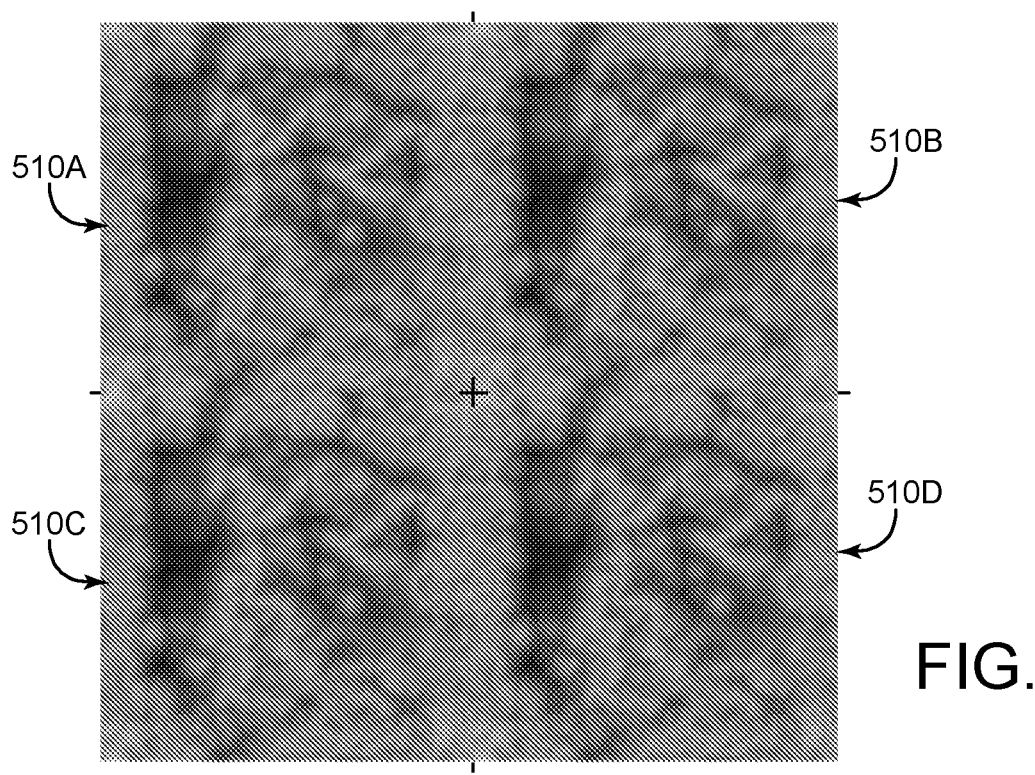

FIGS. 5A-5B are diagrammatic illustrations of example tiled regions of voxels that have been, respectively, unmodified and modified by one or more techniques described herein, according to some implementations.

FIG. 5A shows four unmodified planar slices 500 that have been tiled. Planar slices 500A, 500B, 500C, and 500D are copies of each other, each slice 500 including representations of cloud objects. The planar slices 500A-D are each one slice of a 3D volume that includes multiple planar slices representing 3D cloud objects. Planar slices 500A-D are tiled such that the left side of slice 500B is grafted to the right side of slice 500A, the top side of slice 500C is grafted to the bottom side of slice 500A, the top side of slice 500D is grafted to the bottom side of slide 500B, and the left side of slice 500D is grafted to the right side of slice 500C. Planar slices 500A-D have not been modified with techniques described herein, and thus exhibit discontinuities, including example discontinuities 502, at several of the connections between the tiles.

FIG. 5B shows four modified planar slices 510 that have been tiled, the slices being modified according to features described herein. Planar slices 510A, 510B, 510C, and 510D are copies of each other, each slice 510 including representations of cloud objects. The planar slices 510A-D are each one slice of a 3D volume that includes multiple planar slices representing 3D could objects. Planar slices 510A-D are tiled such that the left side of slice 510B is grafted to the right side of slice 510A, the top side of slice 510C is grafted to the bottom side of slice 510A, the top side of slice 510D is grafted to the bottom side of slide 510B, and the left side of slice 510D is grafted to the right side of slice 510C. Planar slices 510A-D have been modified using techniques described herein, and exhibit no discontinuities at the connections between the tiles.

Example Computing Device

FIG. 6 is a block diagram of an example computing device 600 which may be used to implement one or more features described herein, in accordance with some implementations. In one example, device 600 may be used to implement a computer device (e.g., 102, 110, and/or 116 of FIG. 1), and perform method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/ output devices 614 (e.g., display screen, touchscreen, display goggles or glasses, audio speakers, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may include any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, a grafting engine application 610 and associated data 612. In some implementations, the grafting engine application 610 can include instructions that enable processor 602 to perform the functions described herein, e.g., some or all of the methods of FIGS. 2-3. In various implementations, some or all of the methods of FIGS. 2-3 can be implemented on one or more devices 600, e.g., on one or more processors of each of the one or more devices 600.

For example, memory 604 can include software instructions for a grafting engine 610 that can graft two or more volumes or textures based on input data and provide grafted volumes and/or textures for use by device 600 and/or an online platform (e.g., 102), e.g., storing, modifying, and/or rendering the grafted volumes and/or textures for display by a display device of I/O devices 614. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.). For example, grafted volumes and/or textures generated by the online platform 102 (and/or digital objects and digital features derived therefrom) can be stored at the platform 102 and also sent over a network to one or more client devices for storage and display by the client devices.

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online platform 102 is described as performing operations as described in some implementations herein, any suitable component or combination of components of online platform 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images (including objects, volumes, and/or textures) pre- and post-processing as described herein, where such display device can include any suitable display device, e.g., an LCD, LED, or plasma display screen, CRT, television, monitor, touchscreen, 3-D display screen, AR/VR display, projector, or other visual display device. Some implementations can provide an audio output device, e.g., voice output or synthesis that speaks text. For example, such display devices or output devices can display objects (including one or more object surfaces or other characteristics/features) in a virtual environment that include volumes or textures grafted by grafting engine 610.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 200 and/or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, one or more blocks of methods performed by devices as described herein can use machine learning, e.g., use a trained machine learning model to generate prior voxel slices to obtain prior voxels and used in modifying source voxels, as described in blocks 310 and 314 of method 300. In some implementations, the machine learning model may be a neural network with one or more nodes, arranged according to a network architecture, e.g., in one or more layers, with various nodes connected via the network architecture, and with associated weights. For example, in a training stage of the model, a model can be trained using training data (e.g., samples of volumes including objects and object patterns), and then at an inference stage, the trained model can be input a first volume and output a prior slice of voxels that has similar objects and/or object pattern. For example, the machine learning model can be trained using volumes generated from shaping functions (e.g., noise functions) or other processes, artist-generated volumes, or other volumes. In some implementations, federated learning may be utilized to update the trained model, e.g., where individual devices may each perform local model training, and the updates to the models may be aggregated to update one or more central versions of the model. Training may include supervised or unsupervised learning techniques.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   obtaining, by one or more processors, volumetric data that represents a first volume including one or more three-dimensional (3D) volumetric objects;
   determining a plurality of planar slices of the first volume, wherein each planar slice includes a plurality of voxels that depict an associated planar portion of the first volume;
   for each of the planar slices of the first volume:
      determining a result region and a continuity region in the planar slice, wherein the continuity region is located between the result region and an edge of the planar slice;
      determining a target region within the result region, the target region being adjacent to an edge of the result region; and
      modifying, by the one or more processors, the result region by updating a plurality of source voxels in the target region based on corresponding continuity voxels in the continuity region, wherein the updating is weighted based on a distance of each source voxel from an associated edge of the result region; and
   grafting the modified result regions of the planar slices of the first volume to a second volume at the edge of the result regions to provide a grafted volume.

2. The computer-implemented method of claim 1, wherein the target region is located between an interior region of the result region and the continuity region.

3. The computer-implemented method of claim 1, wherein the continuity voxels are located in the continuity region at a distance from the edge of the result region that is the same as a distance of the corresponding modified source voxels in the result region from the edge of the result region.

4. The computer-implemented method of claim 1, wherein the result region is a tile region, wherein the continuity region completely surrounds the result region, and wherein the second volume is a copy of the modified result region of the first volume.

5. The computer-implemented method of claim 1, wherein modifying the source voxels in the target region is additionally based on one or more other source voxels located adjacent to the source voxels.

6. The computer-implemented method of claim 1, wherein modifying the source voxels in the target region is additionally based on prior voxels that correspond to the source voxels, the prior voxels included in a prior planar slice that is generated by a shaping function.

7. The computer-implemented method of claim 6, wherein the prior slice has a same size as the result region, and wherein each corresponding prior voxel is at a distance from the edge of the prior slice that is the same as a distance of the corresponding source voxel from the edge of the result region.

8. The computer-implemented method of claim 6, wherein the shaping function includes a function that is used in generation of the first volume.

9. The computer-implemented method of claim 6, wherein the shaping function is based on a deep learning model trained with training data that represents volumes similar to the first volume.

10. The computer-implemented method of claim 6, wherein for each source voxel, the corresponding prior voxel of the prior slice is used to determine one of:
keep the source voxel unchanged, modify the source voxel to be the same as the corresponding continuity voxel, or modify the source voxel to be the same as an opposite voxel on an opposite side of the target region.

11. The computer-implemented method of claim 1, wherein modifying the source voxels in the target region is additionally based on corresponding opposite voxels in the target region located at opposite sides of the target region to the source voxels.

12. The computer-implemented method of claim 11, wherein each opposite voxel is at a distance from the edge of the result region that is the same as a distance of the corresponding source voxel from the edge of the result region.

13. The computer-implemented method of claim 11, wherein modifying the source voxels in the target region includes setting one or more of the source voxels to a same value as the value of a corresponding opposite voxel.

14. The computer-implemented method of claim 1, further comprising generating the second volume, wherein the second volume is grafted to the first volume to extend the first volume.

15. The computer-implemented method of claim 1, wherein the volumetric data is in a format of three-dimensional (3D) volume scalar density data, and further comprising, prior to determining the result region and the continuity region, converting the volumetric data to binary field data that represents voxels that are either inside or outside at least one of the one or more 3D volumetric objects represented in the first volume.

16. The computer-implemented method of claim 1, wherein the grafted volume is represented in distance field data.

17. A system comprising:
at least one processor; and
a memory coupled to the at least one processor, with instructions stored thereon that, when executed by the at least one processor, cause the at least one processor to perform operations comprising:
obtaining volumetric data representing a first volume including one or more three-dimensional (3D) volumetric objects;
determining a plurality of planar slices of the first volume, wherein each planar slice includes a plurality of voxels depicting an associated planar portion of the first volume;
for each of the planar slices of the first volume:
determining a result region and an outer region in the planar slice, wherein the outer region is located between the result region and an edge of the planar slice;
determining a target region within the result region, the target region being located adjacent to an edge of the result region; and
modifying the result region by modifying source voxels in the target region based on corresponding opposite voxels in the target region located at opposite sides of the target region to the source voxels, wherein the modifying is weighted based on a distance of the source voxels from the edge of the result region; and
grafting the modified result regions of the planar slices of the first volume to a second volume at the edge of the result regions to provide a grafted volume.

18. The system of claim 17 wherein the modifying the source voxels in the target region is additionally based on continuity voxels in the outer region, the continuity voxels corresponding to the source voxels.

19. A non-transitory computer readable medium that has stored thereon software instructions that, when executed by a processor of a device, cause the processor to perform operations comprising:
obtaining volumetric data representing a first volume including one or more three-dimensional (3D) volumetric objects;
determining a plurality of planar slices of the first volume, wherein each planar slice includes a plurality of voxels depicting an associated planar portion of the first volume;
for each of the planar slices of the first volume:
determining a result region and an outer region in the planar slice, wherein the outer region is located between the result region and an edge of the planar slice;
determining a target region within the result region, the target region being located adjacent to an edge of the result region; and
modifying the result region by modifying source voxels in the target region based on prior voxels that correspond to the source voxels, the prior voxels included in a prior slice that is generated by a shaping function, wherein the modifying is weighted based on a distance of the source voxels from the edge of the result region; and
grafting the modified result regions of the planar slices of the first volume to a second volume at the edge of the result regions to provide a grafted volume.

20. The non-transitory computer readable medium of claim 19, wherein the modifying the source voxels in the target region is additionally based on at least one of:
continuity voxels in the outer region, the continuity voxels corresponding to the source voxels; or
corresponding opposite voxels in the target region located at opposite sides of the target region to the source voxels.

* * * * *